United States Patent
Yan et al.

(10) Patent No.: US 10,334,612 B2
(45) Date of Patent: Jun. 25, 2019

(54) DATA TRANSMISSION METHOD, DEVICE AND SYSTEM

(71) Applicant: Huawei Technologies Co., Ltd., Shenzhen, Guangdong (CN)

(72) Inventors: Zhiyu Yan, Beijing (CN); Qiang Li, Shenzhen (CN); Sha Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 216 days.

(21) Appl. No.: 15/360,607

(22) Filed: Nov. 23, 2016

(65) Prior Publication Data

US 2017/0079054 A1    Mar. 16, 2017

Related U.S. Application Data

(63) Continuation of application No. PCT/CN2014/078579, filed on May 27, 2014.

(51) Int. Cl.
*H04W 72/12* (2009.01)
*H04W 72/04* (2009.01)
(Continued)

(52) U.S. Cl.
CPC ......... *H04W 72/12* (2013.01); *H04W 72/046* (2013.01); *H04W 72/0453* (2013.01); *H04W 72/0466* (2013.01); *H04W 72/14* (2013.01); *H04W 74/0808* (2013.01); *Y02D 70/1262* (2018.01); *Y02D 70/142* (2018.01)

(58) Field of Classification Search
CPC ... H04W 72/12; H04W 72/14; H04W 72/053; H04W 72/046; H04W 72/0466; H04W 74/0808
See application file for complete search history.

(56) References Cited

U.S. PATENT DOCUMENTS

2009/0217118 A1* 8/2009 Miki .................... H04L 1/1887
714/748
2009/0232062 A1* 9/2009 Higuchi ............... H04L 5/0053
370/329
(Continued)

FOREIGN PATENT DOCUMENTS

CN    101272177 A    9/2008
CN    101500311 A    8/2009
(Continued)

OTHER PUBLICATIONS

ETSI EN 301 893 v1.7.1 (Jun. 2012), Harmonized European Standard, Broadband Radio Access Networks (BRAN); 5 GHz high performance RLAN; Harmonized EN covering the essential requirements of article 3.2 of the R&TTE Directive, 90 pages.

*Primary Examiner* — Kevin D Mew

(57) ABSTRACT

A scheduling node sends, in a first TTI to a scheduled node, a scheduling indication of transmitting data by using a preset spectrum resource. After the scheduled node receives the scheduling indication, when it is determined that data can be transmitted in the second TTI according to the scheduling indication, data is transmitted. When the scheduling node determines that the scheduled node can transmit data in the second TTI, it is determined that the data that is transmitted in the second TTI by using the preset spectrum resource is data sent by the scheduled node.

18 Claims, 12 Drawing Sheets

(51) Int. Cl.
*H04W 72/14* (2009.01)
*H04W 74/08* (2009.01)

(56) References Cited

U.S. PATENT DOCUMENTS

| | | | | |
|---|---|---|---|---|
| 2009/0257408 A1* | 10/2009 | Zhang | .................. | H04L 1/1621 |
| | | | | 370/336 |
| 2009/0303937 A1* | 12/2009 | Sawahashi | ............ | H04L 5/0064 |
| | | | | 370/329 |
| 2009/0316758 A1* | 12/2009 | Ahn | .................... | H04B 1/7143 |
| | | | | 375/135 |
| 2010/0074448 A1* | 3/2010 | Park | ........................ | H04J 13/00 |
| | | | | 380/287 |
| 2011/0218006 A1* | 9/2011 | Hanaki | ................. | H04W 76/18 |
| | | | | 455/509 |
| 2013/0051358 A1 | 2/2013 | Turtinen et al. | | |
| 2013/0053083 A1* | 2/2013 | Suh | ....................... | H04L 5/0007 |
| | | | | 455/509 |
| 2014/0036808 A1* | 2/2014 | Pelletier | ................ | H04W 72/14 |
| | | | | 370/329 |
| 2014/0098663 A1* | 4/2014 | Vos | ................... | H04W 72/0486 |
| | | | | 370/230 |

FOREIGN PATENT DOCUMENTS

| | | | |
|---|---|---|---|
| CN | 101568155 | A | 10/2009 |
| CN | 102791029 | A | 11/2012 |
| EP | 3008962 | A1 | 4/2016 |
| EP | 3142403 | A1 | 3/2017 |
| GB | 2476602 | B | 1/2013 |
| KR | 10-2016-0019457 | A | 2/2016 |
| WO | 2014200951 | A2 | 12/2014 |

\* cited by examiner

DATA TRANSMISSION METHOD, DEVICE AND SYSTEM

CROSS-REFERENCE TO RELATED APPLICATIONS

This application is a continuation of International Application No. PCT/CN2014/078579, filed on May 27, 2014, the disclosure of which is hereby incorporated by reference in its entirety.

TECHNICAL FIELD

The present disclosure relates to the field of communications technologies, and in particular, to a data transmission method, device and system.

BACKGROUND

A spectrum resource is a basis of wireless communications. Different spectrum resources are allocated to and used by different communications systems or communications devices, and different communications systems use respective spectrum resources according to respective stipulated rules. Moreover, in the prior art, a spectrum resource that can be used by different communications systems further exists, for example, an unlicensed (unlicensed) spectrum resource.

According to a recently released international spectrum white paper of the Federal Communications Commission (FCC) in USA, unlicensed spectrum resources are currently more than licensed spectrum resources, and the unlicensed spectrum resources are mainly applied to Wireless Fidelity (WiFi). WiFi has disadvantages in aspects such as mobility, security, quality of service (QoS), and simultaneous processing on multi-user scheduling. Therefore, it may be considered that unlicensed spectrums are applied to wireless communications systems. In this way, not only the unlicensed spectrum resources may be effectively used, but also more effective wireless access may be provided, to satisfy ever-growing mobile broadband service requirements. Unlicensed spectrums used by wireless communications systems and operators are not constrained, and therefore, a case in which multiple operators of multiple communications systems intend to occupy a same spectrum resource exists on the unlicensed spectrums.

In some regions, for use of unlicensed spectrums by wireless communications systems, regulations and rules that need to be followed are regulated. For example, in ETSI EN 301 893 released by the European Telecommunications Standards Institute (ETSI), rules such as Listen-Before-Talk (LBT) and a channel bandwidth occupation requirement are regulated for use of unlicensed spectrums. According to a regulation of the ETSI EN 301 893, when performing communication by using an unlicensed spectrum a wireless communications system needs to follow the LBT rule, that is, before using a channel on an unlicensed spectrum, a node first listens to whether the channel is idle, and if the channel is idle, the node may use the channel on the unlicensed spectrum. However, a time for which the channel is occupied is limited, and after the time for which the channel is occupied reaches a maximum limitation, the channel needs to be released for a period of time. According to the regulation of the ETSI EN 301 893, a longest time for which a wireless communications system occupies a channel on an unlicensed spectrum once is 13 ms. Before the channel needs to be occupied next time, the node needs to listen again to whether the channel is idle.

By using Long Term Evolution (LTE) as an example, according to the regulation of the ETSI EN 301 893, before using a channel on an unlicensed spectrum, user equipment (UE) of an LTE system needs to listen to whether the channel is idle. If the channel is idle, the channel is used to transmit uplink data. However, a system resource is allocated in the LTE system in a dynamic shared resource scheduling manner. For uplink data transmission of the UE, an occupied wireless communications resource, a data transmission coding scheme and the like are all indicated by an Evolved NodeB (eNodeB) by using control signaling.

Specifically, in LTE, regardless of an FDD system or a time division duplex (TDD,) system, a relationship between any uplink data transmission and corresponding uplink data scheduling is predefined. For a frequency division duplex (FDD) system, when UE detects, in a subframe (subframe) #n, a PDCCH/EPDCCH that is sent by an eNodeB and that is used to schedule the UE to transmit uplink data, the UE performs uplink data transmission in a subframe #n+4 according to indications of the physical downlink control channel (PDCCH)/enhanced physical downlink control channel (EPDCCH) and a physical hybrid automatic repeat request indicator channel (PHICH). For a TDD system, when UE detects, in a subframe #n, a PDCCH/EPDCCH that is sent by an eNodeB and that is used to schedule the UE to transmit uplink data, the UE performs uplink data transmission in a subframe #n+k according to indications of the PDCCH/EPDCCH and a PHICH, where a value of k is related to a TDD uplink-downlink allocation configuration and n, as shown in Table 1:

TABLE 1 value of k in a TD-LTE 0-6 timeslot allocation manner

| TDD timeslot allocation | Subframe number | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

In this way, when an unlicensed spectrum is used as an operating spectrum of an LTE system, using an FDD system as an example, it is assumed that in the FDD system, UE receives, in a subframe #n−4 and by using a PDCCH, uplink data scheduling information sent by an eNodeB, and needs to send a PUSCH to the eNodeB in a subframe #n, while on an eNodeB side, whether the UE may obtain, by listening to a channel on the unlicensed spectrum, an opportunity for sending uplink data in the subframe #n cannot be "foreseen" by the eNodeB in the Subframe #n−4.

If the eNodeB performs uplink data scheduling on the channel on the unlicensed spectrum on the UE (for example, in the Subframe #n−4 in the FDD system), and when preparing to send uplink data in the subframe #n according to a conventional time sequence relationship between scheduling and transmission of uplink data of the LTE system, the UE detects that a resource of the channel on the unlicensed spectrum is occupied, and cannot send uplink data on the channel according to an indication of the eNodeB, while the eNodeB does not know whether the channel on the unlicensed spectrum detected on a UE side is occupied, the eNodeB misunderstands that the UE already sends uplink data according to a scheduling indication, and receives and demodulates the uplink data in the subframe #n. Because the UE cannot acquire the opportunity for sending uplink data in the subframe #n, and the eNodeB determines that data transmission fails, and misunderstands that the data transmission fails due to poor channel quality, the eNodeB saves or merges a receiving and demodulation result into a soft storage area, to obtain an erroneous data transmission result, reducing transmission efficiency of a wireless communications system.

To resolve the foregoing problem, in the prior art, when detecting that a channel on an unlicensed spectrum is idle, UE occupies a resource of the channel in advance, and notifies an eNodeB of information that the channel on the unlicensed spectrum is available. After receiving a notification that the channel on the unlicensed spectrum is available, the eNodeB schedules the UE to perform uplink data transmission. For example, if the UE confirms in a subframe #n that uplink data may be sent on the channel on the unlicensed spectrum, the UE sends random data on the channel starting from the subframe #n, so as to ensure that the UE may still use the channel in a subframe #n+x, and the UE notifies the eNodeB of a message that the UE may occupy the channel. In this way, after receiving a notification of the UE, the eNodeB may schedule the UE to transmit uplink data in the subframe #n+x of the channel on the unlicensed spectrum.

However, if the UE continuously sends random data on the channel on the unlicensed spectrum from the subframe #n to the subframe #n+x, on one hand, power of the UE is impaired, and on the other hand, because meaningless data is transmitted on the channel on the unlicensed spectrum, a wireless communications resource is wasted.

SUMMARY

Embodiments of the present disclosure provide a data transmission method, device and system, to resolve problems in the prior art that a power loss of a scheduled node is large, and a wireless communications resource is wasted.

According to a first aspect, a data transmission method is provided, including:

sending, in a first transmission time interval TTI to a scheduled node, a scheduling indication of transmitting data by using a preset spectrum resource, where the preset spectrum resource has the following characteristics: a use status of the preset spectrum resource needs to be sensed before the preset spectrum resource is occupied, and an occupation time for which the preset spectrum resource is occupied each time is limited;

determining that the scheduled node can transmit data in a second TTI according to the scheduling indication by using the preset spectrum resource, where the second TTI is a TTI used to send the data that is transmitted by the scheduled node according to the scheduling indication, and the second TTI is a TTI that is after the first TTI in a time sequence and that has a preset time sequence relationship with the first TTI; and determining that the data that is transmitted in the second TTI by using the preset spectrum resource is data sent by the scheduled node.

With reference to the first aspect, in a first possible implementation manner, the second TTI and the first TTI have a preset fixed time sequence relationship; and the determining that the scheduled node can transmit data in a second TTI according to the scheduling indication by using the preset spectrum resource specifically includes: determining that a notification message sent by the scheduled node is received in a third TTI by using a designated spectrum resource, where the notification message is used to indicate that the scheduled node can occupy the preset spectrum resource in the second TTI, the designated spectrum resource is a spectrum resource allocated to and used by a wireless communications system at which the scheduled node is located, and the third TTI is a TTI whose time sequence is not after the time sequence of the second TTI.

With reference to the first aspect, in a second possible implementation manner, the second TTI and the first TTI have a preset fixed time sequence relationship; before the determining that the scheduled node can transmit data in a second TTI according to the scheduling indication by using the preset spectrum resource, the method further includes: receiving and pre-processing the data that is transmitted in the second TTI by using the preset spectrum resource; and the determining that the scheduled node can transmit data in a second TTI according to the scheduling indication by using the preset spectrum resource specifically includes: determining that a notification message sent by the scheduled node is received in a third TTI by using a designated spectrum resource, where the notification message is used to indicate that the scheduled node can occupy the preset spectrum resource in the second TTI, the designated spectrum resource is a spectrum resource allocated to and used by a wireless communications system at which the scheduled node is located, and the third TTI is a TTI whose time sequence is after the time sequence of the second TTI.

With reference to the first aspect, in a third possible implementation manner, the second TTI and the first TTI have a preset fixed time sequence relationship; and the determining that the scheduled node can transmit data in a second TTI according to the scheduling indication by using the preset spectrum resource specifically includes: determining, according to information about a detected signal that is sent by the scheduled node in the second TTI by using the preset spectrum resource, that the scheduled node can transmit the data in the second TTI according to the scheduling indication by using the preset spectrum resource.

With reference to the first aspect, in a fourth possible implementation manner, the second TTI is any TTI of multiple TTIs of a preset first scheduling window; or the second TTI is any TTI of multiple TTIs of a first scheduling window indicated by the scheduling indication; the determining that the scheduled node can transmit data in a second TTI according to the scheduling indication by using the preset spectrum resource specifically includes: determining that a notification message sent by the scheduled node is received in any third TTI in a second scheduling window by using a designated spectrum resource, where the notification message is used to indicate that the scheduled node can occupy the preset spectrum resource in the second TTI, the designated spectrum resource is a spectrum resource allocated to and used by a wireless communications system at which the scheduled node is located, third TTIs in the second scheduling window and second TTIs in the first scheduling window are in a one-to-one correspondence, and a time sequence of each third TTI is not after the time sequence of a second TTI corresponding to the third TTI; and the determining that the data that is transmitted in the second TTI by using the preset spectrum resource is data sent by the scheduled node specifically includes: determining that data that is transmitted in a second TTI by using the preset spectrum resource, where the second TTI corresponds to the third TTI in which the notification message is received and that is of the second TTIs of the first scheduling window is the data sent by the scheduled node.

With reference to the first aspect, in a fifth possible implementation manner, the second TTI is any TTI of multiple TTIs of a preset first scheduling window; or the second TTI is any TTI of multiple TTIs of a first scheduling window indicated by the scheduling indication; before the determining that the scheduled node can transmit data in a second TTI according to the scheduling indication by using the preset spectrum resource, the method further includes: receiving and pre-processing the data that is transmitted in each second TTI of the first scheduling window by using the preset spectrum resource; and the determining that the scheduled node can transmit data in a second TTI according to the scheduling indication by using the preset spectrum resource specifically includes: determining that a notification message sent by the scheduled node is received in any third TTI in a second scheduling window by using a designated spectrum resource, where the notification message is used to indicate that the scheduled node can occupy the preset spectrum resource in the second TTI, the designated spectrum resource is a spectrum resource allocated to and used by a wireless communications system at which the scheduled node is located, third TTIs in the second scheduling window and second TTIs in the first scheduling window are in a one-to-one correspondence, and a time sequence of each third TTI is after the time sequence of a second TTI corresponding to the third TTI; and the determining that the data that is transmitted in the second TTI by using the preset spectrum resource is data sent by the scheduled node specifically includes: determining, from the second TTIs of the first scheduling window in which data is received by using the preset spectrum resource, a second TTI corresponding to the third TTI in which the notification message is received; and determining that data transmitted in the determined second TTI is the data sent by the scheduled node.

With reference to the first aspect, in a sixth possible implementation manner, the second TTI is any TTI of multiple TTIs of a preset first scheduling window; or the second TTI is any TTI of multiple TTIs of a first scheduling window indicated by the scheduling indication; the determining that the scheduled node can transmit data in a second TTI according to the scheduling indication by using the preset spectrum resource specifically includes: determining, according to information about a detected signal that is sent by the scheduled node in any second TTI in the first scheduling window by using the preset spectrum resource, that the scheduled node transmits the data in the second TTI according to the scheduling indication by using the preset spectrum resource.

With reference to the third possible implementation manner of the first aspect, or with reference to the sixth possible implementation manner of the first aspect, in a seventh possible implementation manner, the determining, according to information about a detected signal that is sent by the scheduled node in the second TTI by using the preset spectrum resource, that the scheduled node transmits the data in the second TTI according to the scheduling indication by using the preset spectrum resource specifically includes: detecting energy of data sent by the scheduled node in the second TTI by using the preset spectrum resource; and when the detected energy is greater than a first threshold, determining that the scheduled node transmits data in the second TTI according to the scheduling indication by using the preset spectrum resource; or detecting, by means of sequence correlation, a preset reference sequence that is sent by the scheduled node in the second TTI by using the preset spectrum resource; and when it is detected that an amplitude of the received preset reference sequence is greater than a second threshold, determining that the scheduled node transmits data in the second TTI according to the scheduling indication by using the preset spectrum resource.

With reference to the fourth possible implementation manner of the first aspect, or with reference to the fifth possible implementation manner of the first aspect, or with reference to the sixth possible implementation manner of the first aspect, or with reference to the seventh possible implementation manner of the first aspect, in an eighth possible implementation manner, when first TTIs used to send scheduling indications for different scheduled nodes respectively correspond, in time sequences, to second TTIs that have a same time sequence and that are in the first scheduling window, resource allocation is performed, by using different preset spectrum resources, for the first scheduling window whose second TTIs have the same time sequence; and resource allocation is performed, by using different designated spectrum resources, for the second scheduling window whose third TTIs have a same time sequence; or when first TTIs used to send different scheduling indications for a same scheduled node respectively correspond, in time sequences, to second TTIs that have a same time sequence and that are in the first scheduling window, resource allocation is performed, by using different preset spectrum resources, for the first scheduling window whose second TTIs have the same time sequence; and resource allocation is performed, by using different designated spectrum resources, for the second scheduling window whose third TTIs have a same time sequence, where the preset spectrum resource or designated spectrum resource includes a frequency domain resource, a space domain resource, and a code domain resource.

According to a second aspect, a data transmission method is provided, including:

receiving, in a first transmission time interval TTI, a scheduling indication of transmitting data by using a preset spectrum resource, where the scheduling indication is sent by a scheduling node, where the preset spectrum resource has the following characteristics: a use status of the preset spectrum resource needs to be sensed before the preset spectrum resource is occupied, and an occupation time for which the preset spectrum resource is occupied each time is limited; and when it is determined that data can be transmitted in the second TTI according to the scheduling indication by using the preset spectrum resource, transmitting data in the second TTI by using the preset spectrum resource, where the second TTI is a TTI used to send the data transmitted for the scheduling indication, and the second TTI is a TTI that is after the first TTI in a time sequence and that has a preset time sequence relationship with the first TTI.

With reference to the second aspect, in a first possible implementation manner, the second TTI and the first TTI have a preset fixed time sequence relationship; and the when it is determined that data can be transmitted in the second TTI according to the scheduling indication by using the preset spectrum resource, transmitting data in the second TTI by using the preset spectrum resource specifically includes: when it is determined that the preset spectrum resource is available in the second TTI, sending a notification message in a third TTI by using a designated spectrum resource; and transmitting data in the second TTI by using the preset spectrum resource, where the notification message is used to indicate that the scheduled node can occupy the preset spectrum resource in the second TTI, the designated spectrum resource is a spectrum resource allocated to and used by a wireless communications system at which the scheduling node is located, and the third TTI is a TTI that has a preset time sequence relationship with the second TTI.

With reference to the second aspect, in a second possible implementation manner, the second TTI is any TTI of multiple TTIs of a preset first scheduling window; or the second TTI is any TTI of multiple TTIs of a first scheduling window indicated by the scheduling indication; the when it is determined that data can be transmitted in the second TTI according to the scheduling indication by using the preset spectrum resource, transmitting data in the second TTI by using the preset spectrum resource specifically includes: when it is determined that the preset spectrum resource is available in any second TTI existing among multiple second TTIs of the first scheduling window, transmitting data in the second TTI of the available preset spectrum resource by using the preset spectrum resource.

With reference to the second possible implementation manner of the second aspect, in a third possible implementation manner, when it is determined that data can be transmitted in the second TTI according to the scheduling indication by using the preset spectrum resource, the method further includes: sending a notification message in a third TTI by using a designated spectrum resource, where the third TTI corresponds to the second TTI of the available preset spectrum resource and that is of third TTIs of a second scheduling window, where the notification message is used to indicate that the scheduled node can occupy the preset spectrum resource in the second TTI, the designated spectrum resource is a spectrum resource allocated to and used by a wireless communications system at which the scheduling node is located, third TTIs in the second scheduling window, and second TTIs in the first scheduling window are in a one-to-one correspondence and each third TTI and a second TTI corresponding to the third TTI have a preset fixed time sequence relationship.

According to a third aspect, a data transmission device is provided, including:

a sending module, configured to send, in a first transmission time interval TTI to a scheduled node, a scheduling indication of transmitting data by using a preset spectrum resource, where the preset spectrum resource has the following characteristics: a use status of the preset spectrum resource needs to be sensed before the preset spectrum resource is occupied, and an occupation time for which the preset spectrum resource is occupied each time is limited;

a first determining module, configured to determine that the scheduled node can transmit data in a second TTI according to the scheduling indication by using the preset spectrum resource, where the scheduling indication is sent by the sending module, where the second TTI is a TTI used to send the data that is transmitted by the scheduled node according to the scheduling indication, and the second TTI is a TTI that is after the first TTI in a time sequence and that has a preset time sequence relationship with the first TTI; and a second determining module, configured to: after the first determining module determines that the scheduled node can transmit data in the second TTI according to the scheduling indication by using the preset spectrum resource, where the scheduling indication is sent by the sending module, determine that the data that is transmitted in the second TTI by using the preset spectrum resource is data sent by the scheduled node.

With reference to the third aspect, in a first possible implementation manner, the first determining module is specifically configured to determine that a notification message sent by the scheduled node is received in a third TTI by using a designated spectrum resource, where the notification message is used to indicate that the scheduled node can occupy the preset spectrum resource in the second TTI, the designated spectrum resource is a spectrum resource allocated to and used by a wireless communications system at which the scheduled node is located, the third TTI is a TTI whose time sequence is not after the time sequence of the second TTI, and the second TTI and the first TTI have a preset fixed time sequence relationship.

With reference to the third aspect, in a second possible implementation manner, the first determining module is further configured to: before it is determined that the scheduled node can transmit data in a second TTI according to the scheduling indication by using the preset spectrum resource, receive and pre-process the data that is transmitted in the second TTI by using the preset spectrum resource; and the first determining module is specifically configured to determine that a notification message sent by the scheduled node is received in a third TTI by using a designated spectrum resource, where the notification message is used to indicate that the scheduled node can occupy the preset spectrum resource in the second TTI, the designated spectrum resource is a spectrum resource allocated to and used by a wireless communications system at which the scheduled node is located, the third TTI is a TTI whose time sequence is after the time sequence of the second TTI, and the second TTI and the first TTI have a preset fixed time sequence relationship; and receive, in the third TTI by using the designated spectrum resource, the notification message sent by the scheduled node.

With reference to the third aspect, in a third possible implementation manner, the first determining module is specifically configured to determine, according to information about a detected signal that is sent by the scheduled node in the second TTI by using the preset spectrum resource, that the scheduled node can transmit the data in the second TTI according to the scheduling indication by using the preset spectrum resource, where the second TTI and the first TTI have a preset fixed time sequence relationship.

With reference to the third aspect, in a fourth possible implementation manner, the first determining module is specifically configured to determine that a notification message sent by the scheduled node is received in any third TTI in a second scheduling window by using a designated spectrum resource, where the notification message is used to indicate that the scheduled node can occupy the preset spectrum resource in the second TTI, the designated spectrum resource is a spectrum resource allocated to and used by a wireless communications system at which the scheduled node is located, third TTIs in the second scheduling window and second TTIs in the first scheduling window are in a one-to-one correspondence, and a time sequence of each third TTI is not after the time sequence of a second TTI corresponding to the third TTI; and the second TTI is any TTI of multiple TTIs of a preset first scheduling window, or the second TTI is any TTI of multiple TTIs of a first scheduling window indicated by the scheduling indication; and the second determining module is specifically configured to determine that data that is transmitted in a second TTI by using the preset spectrum resource, where the second TTI corresponds to the third TTI in which the notification message is received and that is of the second TTIs of the first scheduling window is the data sent by the scheduled node.

With reference to the third aspect, in a fifth possible implementation manner, the first determining module is further configured to: before it is determined that the scheduled node can transmit data in a second TTI according to the scheduling indication by using the preset spectrum resource, receive and pre-process the data that is transmitted in each second TTI of the first scheduling window by using the preset spectrum resource; the first determining module is specifically configured to determine that a notification message sent by the scheduled node is received in any third TTI in a second scheduling window by using a designated spectrum resource, where the notification message is used to indicate that the scheduled node can occupy the preset spectrum resource in the second TTI, the designated spectrum resource is a spectrum resource allocated to and used by a wireless communications system at which the scheduled node is located, third TTIs in the second scheduling window and second TTIs in the first scheduling window are in a one-to-one correspondence, and a time sequence of each third TTI is after the time sequence of a second TTI corresponding to the third TTI; and the second TTI is any TTI of multiple TTIs of a preset first scheduling window, or the second TTI is any TTI of multiple TTIs of a first scheduling window indicated by the scheduling indication; and the second determining module is specifically configured to determine, from the second TTIs of the first scheduling window in which data is received by using the preset spectrum resource, a second TTI corresponding to the third TTI in which the notification message is received; and determine that data transmitted in the determined second TTI is the data sent by the scheduled node.

With reference to the third aspect, in a sixth possible implementation manner, the first determining module is specifically configured to determine, according to information about a detected signal that is sent by the scheduled node in any second TTI in the first scheduling window by using the preset spectrum resource, that the scheduled node transmits the data in the second TTI according to the scheduling indication by using the preset spectrum resource, where the second TTI is any TTI of multiple TTIs of a preset first scheduling window, or the second TTI is any TTI of multiple TTIs of a first scheduling window indicated by the scheduling indication.

With reference to the third possible implementation manner of the third aspect, or with reference to the sixth possible implementation manner of the third aspect, in a seventh possible implementation manner, the first determining module is specifically configured to detect energy of data sent by the scheduled node in the second TTI by using the preset spectrum resource; and when the detected energy is greater than a first threshold, determine that the scheduled node transmits data in the second TTI according to the scheduling indication by using the preset spectrum resource; or detect, by means of sequence correlation, a preset reference sequence that is sent by the scheduled node in the second TTI by using the preset spectrum resource; and when it is detected that an amplitude of the received preset reference sequence is greater than a second threshold, determine that the scheduled node transmits data in the second TTI according to the scheduling indication by using the preset spectrum resource.

With reference to the fourth possible implementation manner of the third aspect, or with reference to the fifth possible implementation manner of the third aspect, or with reference to the sixth possible implementation manner of the third aspect, or with reference to the seventh possible implementation manner of the third aspect, in an eighth possible implementation manner, the data transmission device further includes: an allocation module, where the allocation module is configured to: when first TTIs used by the sending module to send scheduling indications for different scheduled nodes respectively correspond, in time sequences, to second TTIs that have a same time sequence and that are in the first scheduling window, perform, by using different preset spectrum resources, resource allocation for the first scheduling window whose second TTIs have the same time sequence; and perform, by using different designated spectrum resources, resource allocation for the second scheduling window whose third TTIs have a same time sequence; or when first TTIs used by the sending module to send different scheduling indications for a same scheduled node respectively correspond, in time sequences, to second TTIs that have a same time sequence and that are in the first scheduling window, perform, by using different preset spectrum resources, resource allocation for the first scheduling window whose second TTIs have the same time sequence; and perform, by using different designated spectrum resources, resource allocation for the second scheduling window whose third TTIs have a same time sequence, where the preset spectrum resource or designated spectrum resource includes a frequency domain resource, a space domain resource, and a code domain resource.

According to a fourth aspect, a data transmission device is provided, including:

a receiving module, configured to receive, in a first transmission time interval TTI, a scheduling indication of transmitting data by using a preset spectrum resource, where the scheduling indication is sent by a scheduling node, where the preset spectrum resource has the following characteristics: a use status of the preset spectrum resource needs to be sensed before the preset spectrum resource is occupied, and an occupation time for which the preset spectrum resource is occupied each time is limited; and a sending module, configured to: when it is determined that data can be transmitted in the second TTI according to the scheduling indication by using the preset spectrum resource, where the scheduling indication is received by the receiving module, transmit data in the second TTI by using the preset spectrum resource, where the second TTI is a TTI used to send the data transmitted for the scheduling indication, and the second TTI is a TTI that is after the first TTI in a time sequence and that has a preset time sequence relationship with the first TTI.

With reference to the fourth aspect, in a first possible implementation manner, the sending module is specifically configured to: when it is determined that the preset spectrum resource is available in the second TTI, send a notification message in a third TTI by using a designated spectrum resource; and transmit data in the second TTI by using the preset spectrum resource, where the notification message is used to indicate that the scheduled node can occupy the preset spectrum resource in the second TTI, the designated spectrum resource is a spectrum resource allocated to and used by a wireless communications system at which the scheduling node is located, the third TTI is a TTI that has a preset time sequence relationship with the second TTI, and the second TTI and the first TTI have a preset fixed time sequence relationship.

With reference to the fourth aspect, in a second possible implementation manner, the sending module is specifically configured to: when it is determined that the preset spectrum resource is available in any second TTI existing among multiple second TTIs of the first scheduling window, transmit data in the second TTI of the available preset spectrum resource by using the preset spectrum resource, where the second TTI is any TTI of multiple TTIs of a preset first scheduling window; or the second TTI is any TTI of multiple TTIs of a first scheduling window indicated by the scheduling indication.

With reference to the second possible implementation manner of the fourth aspect, in a third possible implementation manner, the sending module is further configured to: when it is determined that data can be transmitted in the second TTI according to the scheduling indication by using the preset spectrum resource, send a notification message in a third TTI by using a designated spectrum resource, where the third TTI corresponds to the second TTI of the available preset spectrum resource and that is of third TTIs of a second scheduling window, where the notification message is used to indicate that the scheduled node can occupy the preset spectrum resource in the second TTI, the designated spectrum resource is a spectrum resource allocated to and used by a wireless communications system at which the scheduling node is located, third TTIs in the second scheduling window, and second TTIs in the first scheduling window are in a one-to-one correspondence and each third TTI and a second TTI corresponding to the third TTI have a preset fixed time sequence relationship.

According to a fifth aspect, a data transmission system is provided, including: the data transmission device provided in the third aspect or with reference to any possible implementation manner of the third aspect, and the data transmission device provided in the fourth aspect or with reference to any possible implementation manner of the fourth aspect.

According to a sixth aspect, a data transmission device is provided, including:

a transmitter, configured to send, in a first transmission time interval TTI to a scheduled node, a scheduling indication of transmitting data by using a preset spectrum resource, where the preset spectrum resource has the following characteristics: a use status of the preset spectrum resource needs to be sensed before the preset spectrum resource is occupied, and an occupation time for which the preset spectrum resource is occupied each time is limited; and a processor, configured to determine that the scheduled node can transmit data in a second TTI according to the scheduling indication, sent by the transmitter, by using the preset spectrum resource; and determine that the data that is transmitted in the second TTI by using the preset spectrum resource is data sent by the scheduled node, where the second TTI is a TTI used to send the data that is transmitted by the scheduled node according to the scheduling indication, and the second TTI is a TTI that is after the first TTI in a time sequence and that has a preset time sequence relationship with the first TTI.

With reference to the sixth aspect, in a first possible implementation manner, the device further includes: a receiver, where the receiver is configured to receive, in the third TTI by using the designated spectrum resource, the notification message sent by the scheduled node; and the processor is specifically configured to determine that the receiver receives, in the third TTI by using the designated spectrum resource, the notification message sent by the scheduled node, where the notification message is used to indicate that the scheduled node can occupy the preset spectrum resource in the second TTI, the designated spectrum resource is a spectrum resource allocated to and used by a wireless communications system at which the scheduled node is located, the third TTI is a TTI whose time sequence is not after the time sequence of the second TTI, and the second TTI and the first TTI have a preset fixed time sequence relationship.

With reference to the sixth aspect, in a second possible implementation manner, the device further includes: a receiver, where the receiver is configured to: before the processor determines that the scheduled node can transmit data in a second TTI according to the scheduling indication by using the preset spectrum resource, receive and preprocess the data that is transmitted in the second TTI by using the preset spectrum resource; and receive, in the third TTI by using the designated spectrum resource, the notification message sent by the scheduled node; and the processor is specifically configured to determine that the receiver receives, in the third TTI by using the designated spectrum resource, the notification message sent by the scheduled node, where the notification message is used to indicate that the scheduled node can occupy the preset spectrum resource in the second TTI, the designated spectrum resource is a spectrum resource allocated to and used by a wireless communications system at which the scheduled node is located, the third TTI is a TTI whose time sequence is after the time sequence of the second TTI, and the second TTI and the first TTI have a preset fixed time sequence relationship; and receive, in the third TTI by using the designated spectrum resource, the notification message sent by the scheduled node.

With reference to the sixth aspect, in a third possible implementation manner, the processor is specifically configured to determine, according to information about a detected signal that is sent by the scheduled node in the second TTI by using the preset spectrum resource, that the scheduled node can transmit the data in the second TTI according to the scheduling indication by using the preset spectrum resource, where the second TTI and the first TTI have a preset fixed time sequence relationship.

With reference to the sixth aspect, in a fourth possible implementation manner, the device further includes: a receiver, where the receiver is configured to receive, in any third TTI in the second scheduling window by using a designated spectrum resource, a notification message sent by the scheduled node; the processor is specifically configured to determine that the receiver receives, in the any third TTI in the second scheduling window by using the designated spectrum resource, the notification message sent by the scheduled node, where the notification message is used to indicate that the scheduled node can occupy the preset spectrum resource in the second TTI, the designated spectrum resource is a spectrum resource allocated to and used by a wireless communications system at which the scheduled node is located, third TTIs in the second scheduling window and second TTIs in the first scheduling window are in a one-to-one correspondence, and a time sequence of each third TTI is not after the time sequence of a second TTI corresponding to the third TTI; and the second TTI is any TTI of multiple TTIs of a preset first scheduling window, or the second TTI is any TTI of multiple TTIs of a first scheduling window indicated by the scheduling indication; and the processor is specifically configured to determine that data that is transmitted in a second TTI by using the preset spectrum resource, where the second TTI corresponds to the third TTI in which the notification message is received and that is of the second TTIs of the first scheduling window is the data sent by the scheduled node.

With reference to the sixth aspect, in a fifth possible implementation manner, the device further includes: a receiver, where the receiver is configured to: before the processor determines that the scheduled node can transmit data in a second TTI according to the scheduling indication by using the preset spectrum resource, receive and preprocess the data that is transmitted in each second TTI of the first scheduling window by using the preset spectrum resource; the processor is specifically configured to determine that the receiver receives, in the any third TTI in the second scheduling window by using the designated spectrum resource, the notification message sent by the scheduled node, where the notification message is used to indicate that the scheduled node can occupy the preset spectrum resource in the second TTI, the designated spectrum resource is a spectrum resource allocated to and used by a wireless communications system at which the scheduled node is located, third TTIs in the second scheduling window and second TTIs in the first scheduling window are in a one-to-one correspondence, and a time sequence of each third TTI is after the time sequence of a second TTI corresponding to the third TTI; and the second TTI is any TTI of multiple TTIs of a preset first scheduling window, or the second TTI is any TTI of multiple TTIs of a first scheduling window indicated by the scheduling indication; and the processor is specifically configured to determine, from the second TTIs of the first scheduling window in which data is received by using the preset spectrum resource, a second TTI corresponding to the third TTI in which the notification message is received; and determine that data transmitted in the determined second TTI is the data sent by the scheduled node.

With reference to the sixth aspect, in a sixth possible implementation manner, the processor is specifically configured to determine, according to information about a detected signal that is sent by the scheduled node in any second TTI in the first scheduling window by using the preset spectrum resource, that the scheduled node transmits the data in the second TTI according to the scheduling indication by using the preset spectrum resource, where the second TTI is any TTI of multiple TTIs of a preset first scheduling window, or the second TTI is any TTI of multiple TTIs of a first scheduling window indicated by the scheduling indication.

With reference to the third possible implementation manner of the sixth aspect, or with reference to the sixth possible implementation manner of the sixth aspect, in a seventh possible implementation manner, the processor is specifically configured to detect energy of data sent by the scheduled node in the second TTI by using the preset spectrum resource; and when the detected energy is greater than a first threshold, determine that the scheduled node transmits data in the second TTI according to the scheduling indication by using the preset spectrum resource; or detect, by means of sequence correlation, a preset reference sequence that is sent by the scheduled node in the second TTI by using the preset spectrum resource; and when it is detected that an amplitude of the received preset reference sequence is greater than a second threshold, determine that the scheduled node transmits data in the second TTI according to the scheduling indication by using the preset spectrum resource.

With reference to the fourth possible implementation manner of the sixth aspect, or with reference to the fifth possible implementation manner of the sixth aspect, or with reference to the sixth possible implementation manner of the sixth aspect, or with reference to the seventh possible implementation manner of the sixth aspect, in an eighth possible implementation manner, the processor is further configured to: when first TTIs used by the transmitter to send scheduling indications for different scheduled nodes respectively correspond, in time sequences, to second TTIs that have a same time sequence and that are in the first scheduling window, perform, by using different preset spectrum resources, resource allocation for the first scheduling window whose second TTIs have the same time sequence; and perform, by using different designated spectrum resources, resource allocation for the second scheduling window whose third TTIs have a same time sequence; or when first TTIs used by the transmitter to send different scheduling indications for a same scheduled node respectively correspond, in time sequences, to second TTIs that have a same time sequence and that are in the first scheduling window, perform, by using different preset spectrum resources, resource allocation for the first scheduling window whose second TTIs have the same time sequence; and perform, by using different designated spectrum resources, resource allocation for the second scheduling window whose third TTIs have a same time sequence, where the preset spectrum resource or designated spectrum resource includes a frequency domain resource, a space domain resource, and a code domain resource.

According to a seventh aspect, a data transmission device is provided, including:

a receiver, configured to receive, in a first transmission time interval TTI, a scheduling indication of transmitting data by using a preset spectrum resource, where the scheduling indication is sent by a scheduling node, where the preset spectrum resource has the following characteristics: a use status of the preset spectrum resource needs to be sensed before the preset spectrum resource is occupied, and an occupation time for which the preset spectrum resource is occupied each time is limited; and a transmitter, configured to: when it is determined that data can be transmitted in the second TTI according to the scheduling indication by using the preset spectrum resource, where the scheduling indication is received by the receiver, transmit data in the second TTI by using the preset spectrum resource, where the second TTI is a TTI used to send the data transmitted for the scheduling indication, and the second TTI is a TTI that is after the first TTI in a time sequence and that has a preset time sequence relationship with the first TTI.

With reference to the seventh aspect, in a first possible implementation manner, the transmitter is specifically configured to: when it is determined that the preset spectrum resource is available in the second TTI, send a notification message in a third TTI by using a designated spectrum resource; and transmit data in the second TTI by using the preset spectrum resource, where the notification message is used to indicate that the scheduled node can occupy the preset spectrum resource in the second TTI, the designated spectrum resource is a spectrum resource allocated to and used by a wireless communications system at which the scheduling node is located, the third TTI is a TTI that has a preset time sequence relationship with the second TTI, and the second TTI and the first TTI have a preset fixed time sequence relationship.

With reference to the seventh aspect, in a second possible implementation manner, the transmitter is specifically configured to: when it is determined that the preset spectrum resource is available in any second TTI existing among multiple second TTIs of the first scheduling window, transmit data in the second TTI of the available preset spectrum resource by using the preset spectrum resource, where the second TTI is any TTI of multiple TTIs of a preset first scheduling window; or the second TTI is any TTI of multiple TTIs of a first scheduling window indicated by the scheduling indication.

With reference to the second possible implementation manner of the seventh aspect, in a third possible implementation manner, the transmitter is further configured to: when it is determined that data can be transmitted in the second TTI according to the scheduling indication by using the preset spectrum resource, send a notification message in a third TTI by using a designated spectrum resource, where the third TTI corresponds to the second TTI of the available preset spectrum resource and that is of third TTIs of a second scheduling window, where the notification message is used to indicate that the scheduled node can occupy the preset spectrum resource in the second TTI, the designated spectrum resource is a spectrum resource allocated to and used by a wireless communications system at which the scheduling node is located, third TTIs in the second scheduling window, and second TTIs in the first scheduling window are in a one-to-one correspondence and each third TTI and a second TTI corresponding to the third TTI have a preset fixed time sequence relationship.

According to an eighth aspect, a data transmission system is provided, including: the data transmission device provided in the sixth aspect or any implementation manner of the sixth aspect, and the data transmission device provided in the seventh aspect or any implementation manner of the seventh aspect.

Beneficial effects of the embodiments of the present disclosure include:

According to a data transmission method, device and system provided in the embodiments of the present disclosure, a scheduling node sends, in a first TTI to a scheduled node, a scheduling indication of transmitting data by using a preset spectrum resource; after the scheduled node receives the scheduling indication, when it is determined that data can be transmitted in the second TTI according to the scheduling indication by using the preset spectrum resource, data is transmitted in the second TTI by using the preset spectrum resource; and when the scheduling node determines that the scheduled node can transmit data in the second TTI according to the scheduling indication by using the preset spectrum resource, it is determined that the data that is transmitted in the second TTI by using the preset spectrum resource is data sent by the scheduled node. According to the data transmission method provided in the embodiments of the present disclosure, after receiving a scheduling indication, a scheduled node needs to determine whether the scheduled node can transmit data according to the scheduling indication by using a second TTI of a channel of a preset spectrum resource. When a determining result is yes, the scheduled node transmits data according to the scheduling indication in the second TTI by using the channel of the preset spectrum resource, instead of a case in the prior art in which when determining that the channel of the preset spectrum resource is idle, the scheduled node sends, to a scheduling node, a notification that the scheduled node can occupy the channel of the preset spectrum resource, and continuously occupies the channel by sending random data on the channel of the preset spectrum resource, until receiving the scheduling indication and completing formal data transmission, so as to reduce a power loss of the scheduled node, and save a wireless communications resource. After sending a scheduling indication to a scheduled node, and before determining that data transmitted in a second TTI by using a channel of a preset spectrum resource is data transmitted by the scheduled node, a scheduling node needs to determine that the scheduled node can occupy the channel of the preset spectrum resource according to the scheduling indication. Compared with the prior art in which data is received regardless of whether the scheduled node successfully occupies the channel, it may be avoided that in a case in which the scheduled node does not send data according to the scheduling indication, the scheduling node saves or merges data that is not sent by the scheduled node and that is mistakenly received or demodulated from the channel of the preset spectrum resource into a soft storage area, so as to improve transmission efficiency of a wireless communications system.

DETAILED DESCRIPTION

Embodiments of the present disclosure provide a data transmission method, device and system. Exemplary embodiments of the present disclosure are described below with reference to accompanying drawings of the specification. It should be understood that the exemplary embodiments described herein are only used for describing and explaining the present disclosure but not intended to limit the present disclosure. Moreover, the embodiments in this application and characteristics in the embodiments may be combined with each other without conflict.

Figure 1:
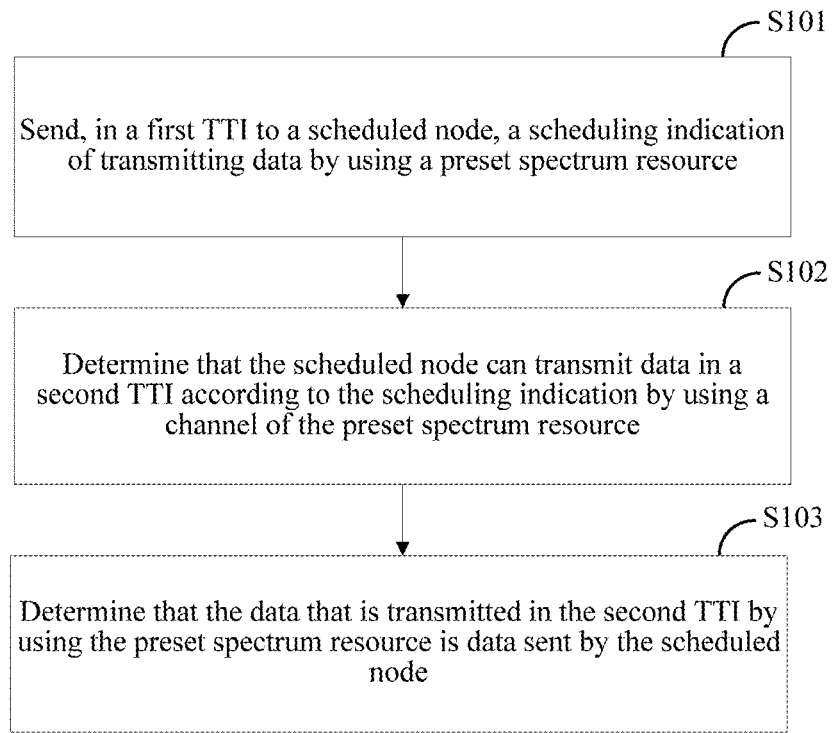
FIG. 1 is a flowchart of a data transmission method according to an embodiment of the present disclosure.

An embodiment of the present disclosure provides a data transmission method, which is applied to a scheduling node, and as shown in FIG. 1, includes the following steps.

S101: Send, in a first transmission time interval (TTI) to a scheduled node, a scheduling indication of transmitting data by using a preset spectrum resource, where the preset spectrum resource has the following characteristics: a use status of the preset spectrum resource needs to be sensed before the preset spectrum resource is occupied, and an occupation time for which the preset spectrum resource is occupied each time is limited.

S102: Determine that the scheduled node can transmit data in a second TTI according to the scheduling indication by using a channel of the preset spectrum resource, where the second TTI is a TTI used to send the data that is transmitted by the scheduled node according to the scheduling indication, and the second TTI is a TTI that is after the first TTI in a time sequence and that has a preset time sequence relationship with the first TTI.

S103: Determine that the data that is transmitted in the second TTI by using the preset spectrum resource is data sent by the scheduled node.

Figure 2:
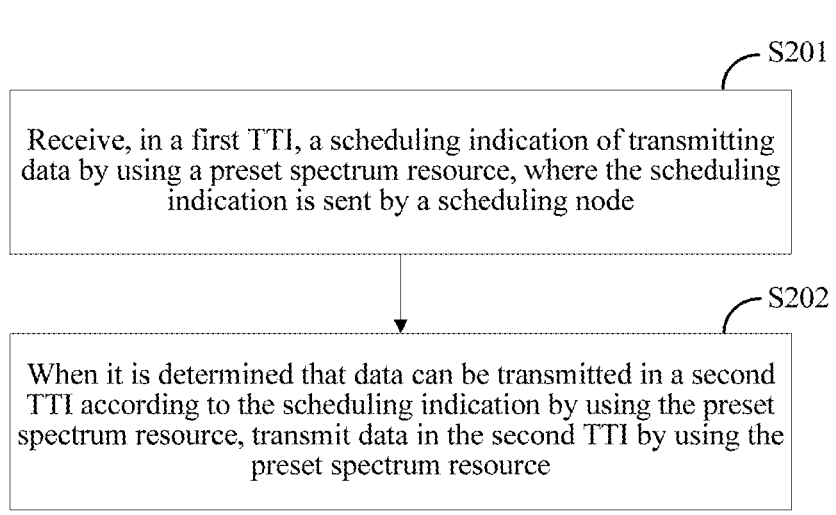
FIG. 2 is a flowchart of a data transmission method according to an embodiment of the present disclosure.

Corresponding to the method shown in FIG. 1, an embodiment of the present disclosure further provides a data transmission method, which is applied to a scheduled node, and as shown in FIG. 2, includes the following steps.

S201: Receive, in a first TTI, a scheduling indication of transmitting data by using a preset spectrum resource, where the scheduling indication is sent by a scheduling node, where the preset spectrum resource has the following characteristics: a use status of the preset spectrum resource needs to be sensed before the preset spectrum resource is occupied, and an occupation time for which the preset spectrum resource is occupied each time is limited.

S202: When it is determined that data can be transmitted in the second TTI according to the scheduling indication by using the preset spectrum resource, transmit data in the second TTI by using the preset spectrum resource, where the second TTI is a TTI used to send the data transmitted for the scheduling indication, and the second TTI is a TTI that is after the first TTI in a time sequence and that has a preset time sequence relationship with the first TTI.

Further, in this embodiment of the present disclosure, a scheduling node is used to send a scheduling indication to a scheduled node, and the scheduled node performs data transmission with the scheduling node according to the scheduling indication. By using an LTE system as an example, the scheduling node may be an eNodeB, the scheduled node may be UE, and after the eNodeB sends the scheduling indication to the UE, the UE sends uplink data to the eNodeB according to the scheduling indication.

Methods and related devices provided in the present disclosure are described in detail below with reference to accompanying drawings by using specific embodiments.

Embodiment 1

Figure 3:
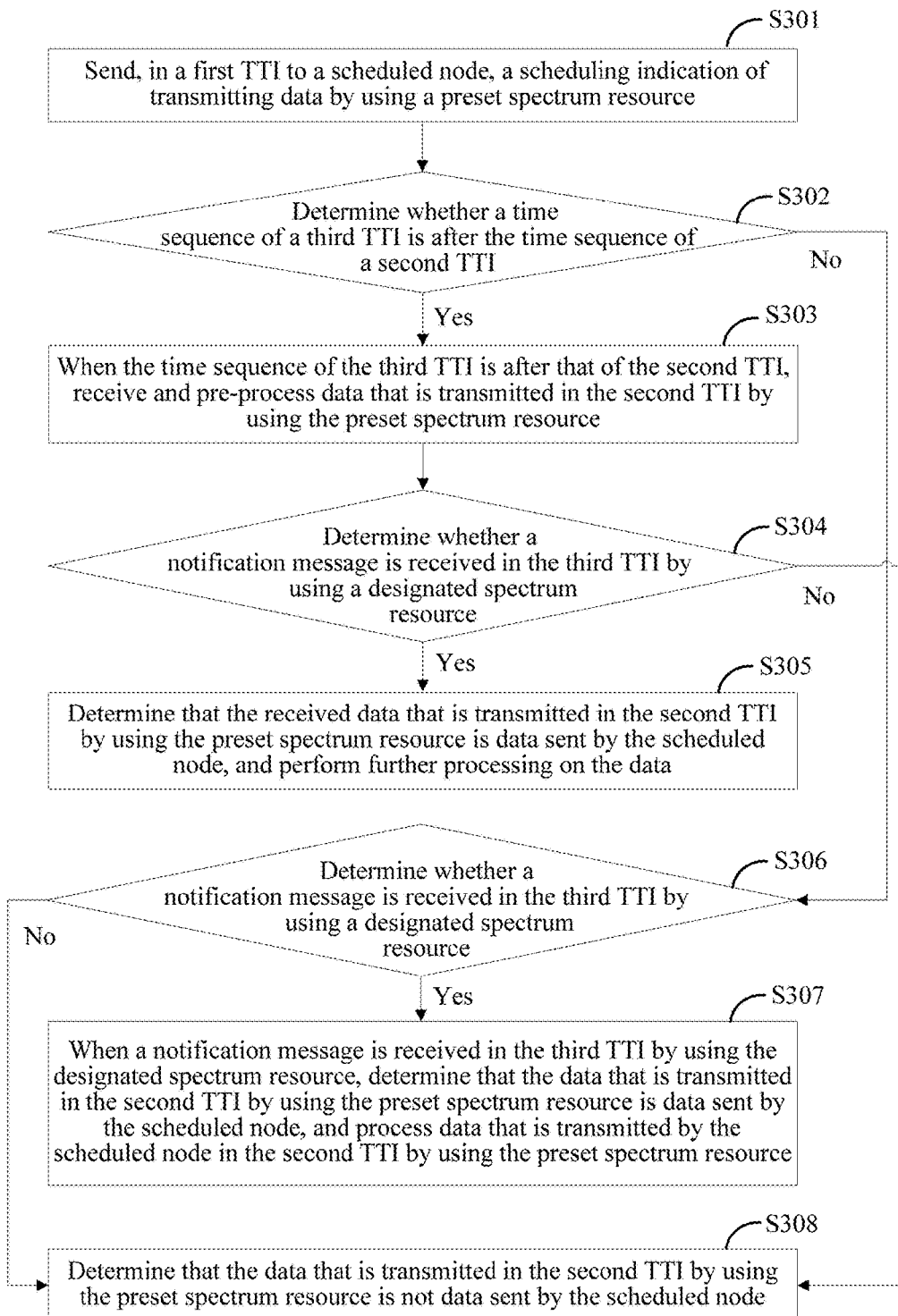
FIG. 3 is a flowchart of a data transmission method according to Embodiment 1 of the present disclosure.

In Embodiment 1 of the present disclosure, a data transmission method is provided. In Embodiment 1, a second TTI and a first TTI have a preset fixed time sequence relationship, and a first implementation manner is provided for step S102 described above. The method is applied to a scheduling node, and as shown in FIG. 3, specifically include the following steps:

S301: Send, in a first TTI to a scheduled node, a scheduling indication of transmitting data by using a preset spectrum resource, where the preset spectrum resource has the following characteristics: a use status of the preset spectrum resource needs to be sensed before the preset spectrum resource is occupied, and an occupation time for which the preset spectrum resource is occupied each time is limited.

In this step, the preset spectrum resource may be a spectrum resource that can be used by multiple wireless communications systems (for example, an LTE system, a Time Division-Code Division Multiple Access (TD-SCDMA) system, a Wideband Code Division Multiple Access (WCDMA) system) or different types of devices. Before occupying a channel of the preset spectrum resource, various wireless communications devices need to sense a use status of the channel that the various wireless communications devices intend to occupy, and an occupation time for which the preset spectrum resource is occupied each time is limited, for example, an unlicensed spectrum resource.

Further, the use status of the preset spectrum resource may include characteristics about the use status of the channel, for example, whether the channel is idle, and when a particular system needs to occupy the channel, if the channel is not idle, whether an occupation priority of a system that currently occupies the channel is higher than that of the particular system.

Further, the scheduling node may send the scheduling indication to the scheduled node by using the channel of the preset spectrum resource, or may send the scheduling indication to the scheduled node by using a channel that is allocated to and used by a system at which the scheduling node is located. By using an LTE system as an example, an eNodeB used as the scheduling node may send the scheduling indication to UE used as the scheduled node by using a PDCCH or an EPDCCH, and instruct the UE to transmit uplink data on a preset channel.

In step S302 to step S308 described below, it is determined whether a notification message sent by the scheduled node is received in a third TTI by using a designated spectrum resource, where the notification message is used to indicate that the scheduled node can occupy the preset spectrum resource in the second TTI, the designated spectrum resource is a spectrum resource allocated to and used by a wireless communications system at which the scheduled node is located, and the third TTI is a TTI that has a preset time sequence relationship with the second TTI.

S302: Determine whether a time sequence of a third TTI is after the time sequence of a second TTI, and if yes, enter step S303; or if no, enter step S306.

Further, the first TTI is a TTI in which the scheduling indication is sent, and the second TTI is a TTI in which the scheduled node transmits data to the scheduling node according to the scheduling indication. The first TTI and the second TTI may have a time sequence correspondence, and the second TTI is a preset TTI whose time sequence is after that of the first TTI. Moreover, the correspondence is commonly known by both the scheduled node and the scheduling node. The scheduled node first determines, according to the first TTI, and the time sequence correspondence between the first TTI and the second TTI, the second TTI in which data needs to be transmitted, and then determines whether data can be transmitted in the second TTI according to the scheduling indication by using the channel of the preset spectrum resource.

because the time sequence correspondence between the first TTI and the second TTI is commonly known by both the scheduled node and the scheduled node, the scheduling node may determine, according to a time sequence of the first TTI in which the scheduling node sends the scheduling indication, the second TTI in which data sent by the scheduled node may be received, and before receiving the data, first determines whether the scheduled node completes data transmission in the second TTI by using the channel of the preset spectrum resource. Compared with the prior art in which the scheduling node does not perform determining but directly receives data in the second TTI, it may be avoided that in a case in which the scheduled node does not send data according to the scheduling indication, a receiving and demodulation result is saved or merged into a soft storage area, so as to improve data transmission efficiency.

By using an LTE system as an example, for an FDD system, when UE used as a scheduled node detects, in a subframe #n, a PDCCH/EPDCCH that is sent by an eNodeB used as a scheduling node and that is used to schedule the UE to transmit uplink data, the UE performs uplink data transmission in a subframe #n+4 according to indications of the PDCCH/EPDCCH and a PHICH. For a TDD system, when UE detects, in a subframe #n, a PDCCH/EPDCCH that is sent by an eNodeB and that is used to schedule the UE to transmit uplink data, the UE performs uplink data transmission in a subframe #n+k according to indications of the PDCCH/EPDCCH and a PHICH, where a value of k is related to a TDD uplink-downlink allocation configuration and n, as shown in Table 1 in the background. That is, for the FDD system of LTE, when the first TTI is the subframe #n, the second TTI may be the subframe #n+4, that is, the second TTI is a fourth TTI after the first TTI in the time sequence. For the TDD system of LTE, when the first TTI is the subframe #n, the second TTI may be the subframe #n+k, that is, the second TTI is a $k^{th}$ TTI after the first TTI in the time sequence.

Further, a TTI is an independent decoding transmission length in a radio link, and a size of the TTI is determined according to a size of a TTI defined in a communications system for implementing this method. For example, in an LTE system, a TTI is a subframe.

S303: When the time sequence of the third TTI is after the time sequence of the second TTI, receive and pre-process data that is transmitted in the second TTI by using the preset spectrum resource.

Further, the second TTI and the third TTI also have a preset correspondence, that is, the third TTI is a TTI that has a preset time sequence relationship with the second TTI. That is, the time sequence of the third TTI may be before that of the second TTI, or may be after the time sequence of the second TTI, or may be the same as that of the second TTI. The designated spectrum resource is a spectrum resource allocated to a system at which the scheduled node and the scheduling node that implement this embodiment of the present disclosure are located, and the designated spectrum resource may also be a non-preset spectrum resource that the scheduling node and the scheduled node agree on in advance except the preset spectrum resource. By using LTE as an example, a PDCCH, an EPDCCH or the like is a channel allocated to and used by the LTE system. Therefore, to enable the scheduling node to know whether the scheduled node successfully occupies the channel of the preset spectrum resource in the second TTI, the scheduling node may receive, in the third TTI by using the designated spectrum resource, a notification message sent by the scheduled node, the scheduling node determines, by using the notification message, or by means of whether the notification message is received, whether the scheduled node successfully occupies the channel of the preset spectrum resource in the second TTI.

Further, when the time sequence of the third TTI is after the time sequence of the second TTI, if the scheduled node can occupy the channel of the preset spectrum resource in the second TTI, because the second TTI arrives earlier than the third TTI, if the third TTI arrives, and the scheduled node sends a notification message in the third TTI by using the channel of the designated spectrum resource (a notification message representing whether the scheduled node successfully occupies the preset spectrum resource in the second TTI), and determines that the scheduled node sends data in the second TTI by using the channel of the preset spectrum resource. In this case, it is already late to receive data in the second TTI by using the channel of the preset spectrum resource because the second TTI already passes. Therefore, when the time sequence of the third TTI is after the time sequence of the second TTI, when the second TTI arrives, the scheduling node needs to receive data that is transmitted in the second TTI by using the preset spectrum resource, and may first pre-process the received data.

Further, in the prior art, after receiving data transmitted by the scheduled node, the scheduling node may store and demodulate the received data, and store the data into a soft storage area or merge the data with data in a soft storage area according to demodulation correctness. That is, if the received data is new data, the scheduling node may demodulate the data and replace the data in the current soft storage area with the new data, or if the received data is retransmitted data, the scheduling node may merge the retransmitted data and the data in the current soft storage area, and attempt to decode merged data. By using an LTE system as an example, on an eNodeB side, when uplink data is received in a subframe by using a hybrid automatic repeat request (HARQ) process, the HARQ process receives one or two TBs and corresponding HARQ information from an HARQ entity. For the received TB, it is first determined whether the received uplink data is new uplink data or retransmitted uplink data. If the received uplink data is new uplink data, the data in the current soft storage area is replaced with the new uplink data; or if the received uplink data is retransmitted uplink data, the uplink data and the data in the soft storage area are merged, and then data in the current soft storage area attempts to be decoded.

In this embodiment, pre-processing may include storage, that is, data received by in the second TTI by using the preset spectrum resource is first saved. When the third TTI arrives, according to the notification message sent in the third TTI by using the designated spectrum resource, when it is determined that the scheduled node successfully occupies the preset spectrum resource in the second TTI, the saved data is demodulated, or when it is determined that the scheduled node unsuccessfully occupies the preset spectrum resource in the second TTI, it is determined that the saved data is not sent by the scheduled node, and the data may not be demodulated. Pre-processing may also include storage and demodulation, that is, data received in the second TTI by using the preset spectrum resource is first saved, and the data is demodulated. When the third TTI arrives, according to the notification message sent in the third TTI by using the channel of the designated spectrum resource, when it is determined that the scheduled node successfully occupies the preset spectrum resource in the second TTI, the demodulated data is saved into the soft storage area or the demodulated data and the data in the soft storage area are merged according to an actual situation, or when it is determined that the scheduled node unsuccessfully occupies the preset spectrum resource in the second TTI, it is determined that the saved data is not sent by the scheduled node, and the data may not be saved into the soft storage area, or not be merged with the data in the soft storage area.

S304: Determine whether a notification message is received in the third TTI by using a designated spectrum resource, and if yes, enter step S305; or if no, enter step S308.

Further, a channel of the designated spectrum resource has a limited bandwidth resource, and therefore, notification information whose load is relatively small may be sent by using the channel of the designated spectrum resource, and data whose load is relatively large is sent by using the second TTI of the channel of the preset spectrum resource.

S305: When it is determined that a notification message is received in the third TTI by using the designated spectrum resource, determine that the data that is transmitted in the second TTI by using the preset spectrum resource and that is received in S303 is data sent by the scheduled node and perform further processing on the data. This process ends.

Further, if pre-processing is a storage operation, further processing in this step may be demodulation and a subsequent operation, or if pre-processing is storage and demodulation, further processing in this step may be storage into the soft storage area or performing merging with the data in the soft storage area.

Further, after the data transmitted by the scheduled node on the channel of the preset spectrum resource is received, an acknowledgment message may be further sent to the scheduled node. By using an LTE system as an example, an HARQ ACK or NACK message may be sent to the scheduled node.

S306: When the time sequence of the third TTI is not after the time sequence of the second TTI, determine whether a notification message is received in the third TTI by using the designated spectrum resource, and if yes, enter step S307; or if no, enter step S308.

In this step, the time sequence of the third TTI is not after the time sequence of the second TTI, that is, the time sequence of the third TTI is before that of the second TTI, or is the same as a time sequence of the second TTI. Because the third TTI arrives before the second TTI, or arrives at the same time as the second TTI does, it may be first determined whether a notification message is received in the third TTI by using the designated spectrum resource, and then determined whether the scheduled node successfully occupies the preset spectrum resource in the second TTI.

S307: When the time sequence of the third TTI is not after the time sequence of the second TTI, and a notification message is received in the third TTI by using the designated spectrum resource, determine that the data that is transmitted in the second TTI by using the preset spectrum resource is data sent by the scheduled node, and process data that is transmitted by the scheduled node in the second TTI by using the preset spectrum resource. This process ends.

In this step, a processing operation may be an operation such as storage, demodulation, saving into the soft memory or performing merging with the data in the soft storage area.

In this embodiment, the scheduling node determines, by means of whether a notification message is received, whether the scheduled node successfully occupies the preset spectrum resource in the second TTI. That is, when receiving, in the third TTI by using the designated spectrum resource, a notification message that is sent by the scheduled node and that is used to indicate that the scheduled node can occupy the preset spectrum resource in the second TTI, the scheduling node determines that the data that is transmitted in the second TTI by using the preset spectrum resource is sent by the scheduled node, or when receiving, in the third TTI not by using the designated spectrum resource, a notification message sent by the scheduled node, the scheduling node determines that the data that is transmitted in the second TTI by using the preset spectrum resource is not data sent by the scheduled node.

Further, it may also be implemented that the scheduled node determines, by using specific content of a notification message, whether the scheduled node successfully occupies the preset spectrum resource in the second TTI. Specifically, it may be implemented that regardless of whether the scheduled node successfully occupies the preset spectrum resource in the second TTI, the scheduled node sends a notification message to the scheduling node. That is, when the scheduling node receives, in the third TTI by using the channel of the designated spectrum resource, a notification message that is sent by the scheduled node and that is used to represent that the scheduled node can occupy the preset spectrum resource in the second TTI, it is determined that the data that is transmitted in the second TTI by using the preset spectrum resource is data sent by the scheduled node, and when the scheduling node receives, in the third TTI by using the designated spectrum resource, a notification message that is sent by the scheduled node and that is used to represent that the scheduled node cannot occupy the preset spectrum resource in the second TTI, it is determined that the data that is transmitted in the second TTI by using the preset spectrum resource is not data sent by the scheduled node. It may also be implemented that only when successfully occupying the channel of the preset spectrum resource in the second TTI, the scheduled node sends a notification message to the scheduling node.

S308: When a notification message representing that the scheduled node can occupy the preset spectrum resource in the second TTI is not received in the third TTI by using the designated spectrum resource, determine that the data that is transmitted in the second TTI by using the preset spectrum resource is not data sent by the scheduled node.

Embodiment 2

Figure 4:
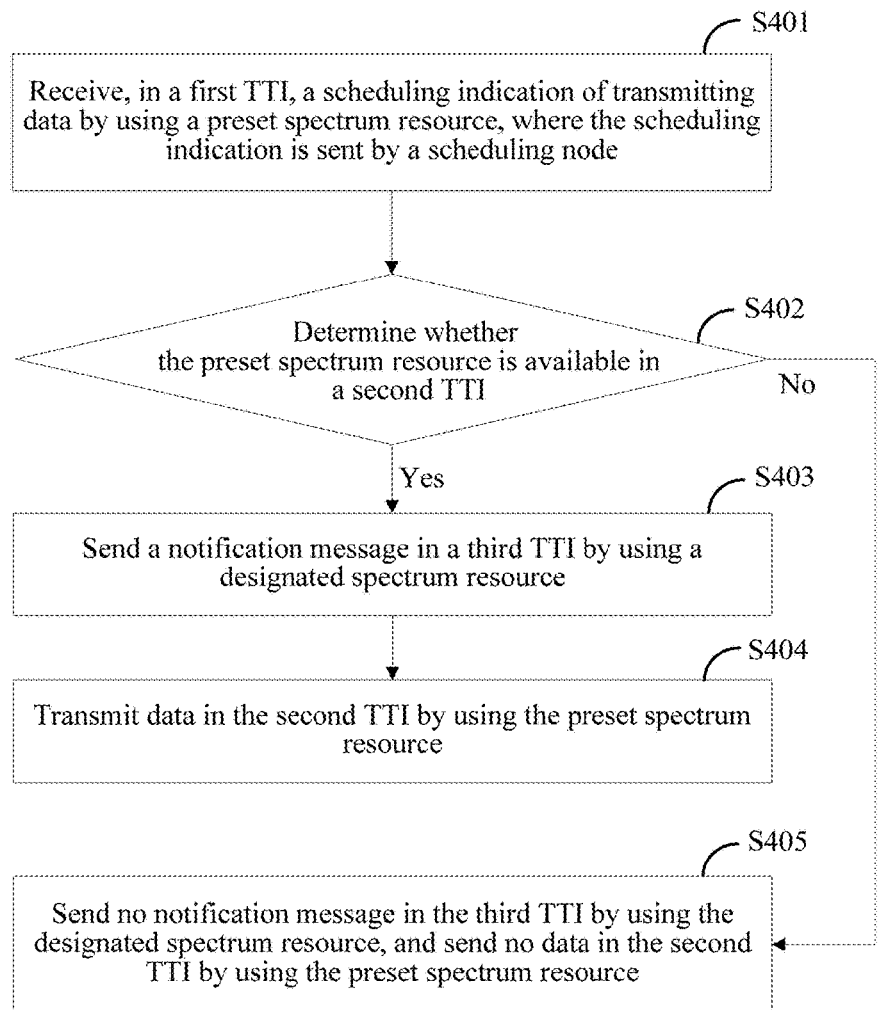
FIG. 4 is a flowchart of a data transmission method according to Embodiment 2 of the present disclosure.

Corresponding to the data transmission method provided in Embodiment 1, in Embodiment 2 of the present disclosure, a data transmission method is provided, applied to a scheduled node, and as shown in FIG. 4, specifically includes the following steps:

S401: Receive, in a first TTI, a scheduling indication of transmitting data by using a preset spectrum resource, where the scheduling indication is sent by a scheduling node, where the preset spectrum resource has the following characteristics: a use status of the preset spectrum resource needs to be sensed before the preset spectrum resource is occupied, and an occupation time for which the preset spectrum resource is occupied each time is limited.

S402: Determining whether the preset spectrum resource is available in a second TTI, and if yes, enter step S403; or if no, enter step S405.

S403: When it is determined that the preset spectrum resource is available in the second TTI, send a notification message in a third TTI by using a designated spectrum resource, where the designated spectrum resource is a spectrum resource allocated to and used by a wireless communications system at which the scheduling node is located, and the third TTI is a TTI that has a preset time sequence relationship with the second TTI.

Further, a notification manner of whether the preset spectrum resource is successfully occupied in the second TTI may be agreed on in advance with the scheduling node. During specific implementation, when it is determined that a channel of the preset spectrum resource is idle in the second TTI, a notification message representing that the scheduled node can occupy the preset spectrum resource in the second TTI may be sent in the third TTI by using the designated spectrum resource, or when it is determined that the preset spectrum resource is not idle in the second TTI, a notification message representing that the scheduled node cannot occupy the preset spectrum resource in the second TTI may be sent in the third TTI by using the designated spectrum resource. When it is determined that the preset spectrum resource is idle in the second TTI, a notification message representing that the scheduled node can occupy the preset spectrum resource in the second TTI may be sent in the third TTI by using the designated spectrum resource, or when it is determined that the preset spectrum resource is not idle in the second TTI, no notification message may be sent in the third TTI by using the designated spectrum resource.

S404: Transmit data in the second TTI by using the preset spectrum resource; and this process ends, where the notification message is used to indicate that the scheduled node can occupy the channel of the preset spectrum resource in the second TTI.

Further, sending, by using the designated spectrum resource, the notification message representing that the scheduled node can occupy the preset spectrum resource in the second TTI may be sending by using a preset channel of the designated spectrum resource. The preset channel refers to a channel that is preset between the scheduled node and the scheduled node and that is used to be sent by the scheduled node to represent that the scheduled node can occupy the preset spectrum resource. Moreover, the preset channel may be a periodic channel.

Further, step S403 and step S404 are not performed in a strict sequence.

S405: When it is determined that the preset spectrum resource is not available in the second TTI, send no notification message in the third TTI by using the designated spectrum resource, and send no data in the second TTI by using the preset spectrum resource.

Figure 5:
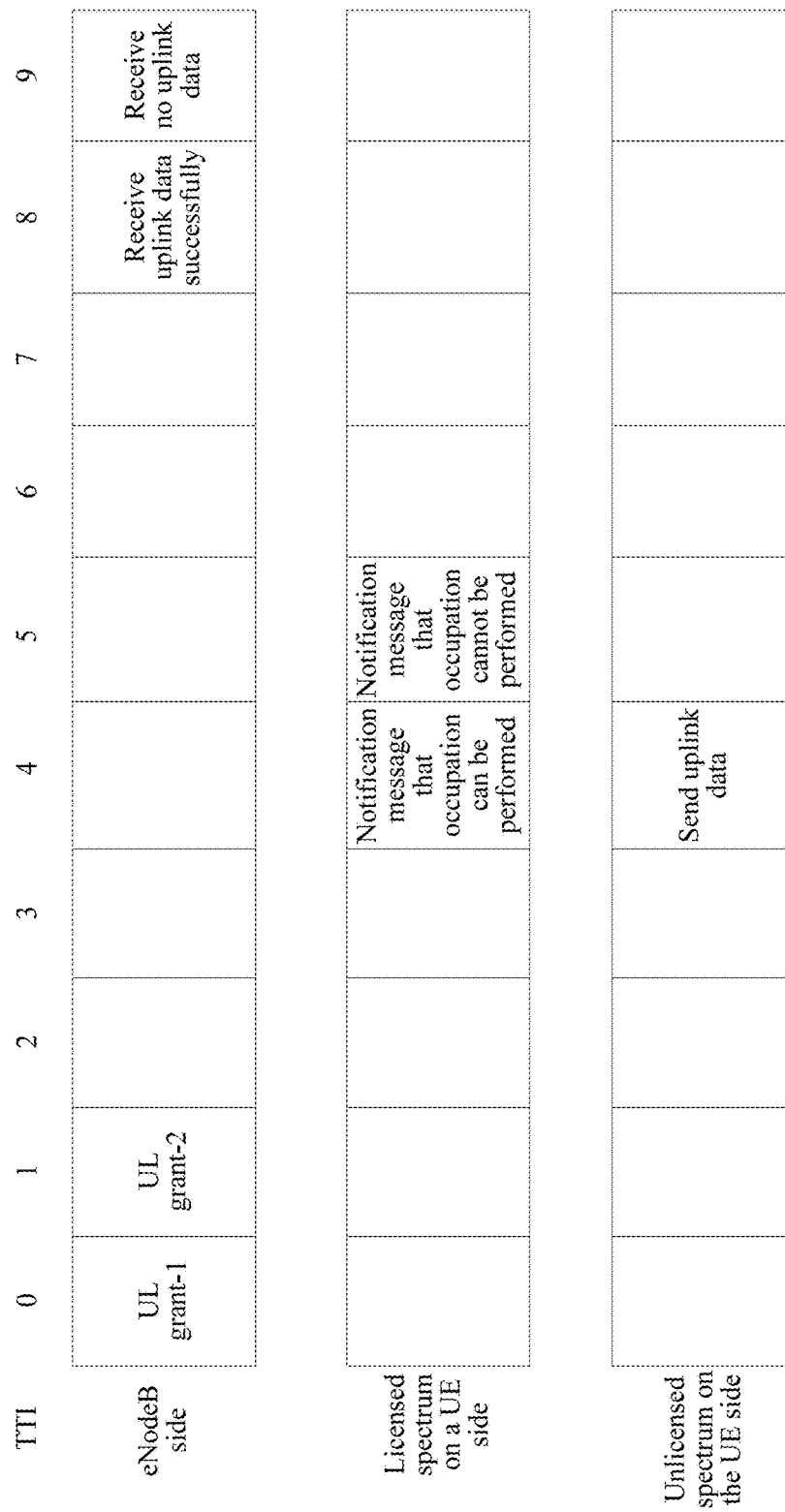
FIG. 5 is a schematic diagram of resource occupation of a data transmission method according to an example 1 of the present disclosure.

By using an LTE system as an example below, the data transmission methods provided in Embodiment 1 and Embodiment 2 are exemplified by using an example 1. In the example 1, it is assumed that a second TTI has a time sequence the same as that of a third TTI:

Example 1: it is assumed that in an FDD system of LTE, an eNodeB is used as a scheduling node, and UE is used as a scheduled node. As shown in FIG. 5, the eNodeB sends an uplink scheduling indication (UL grant-1) and a UL grant-2 to the UE in the zeroth TTI and the first TTI respectively by using a PDCCH, to instruct the UE to send uplink data by using a channel on an unlicensed spectrum (a component carrier (CC) on an unlicensed spectrum).

After receiving the UL grant-1 that is sent by the eNodeB in the zeroth TTI, the UE determines, according to a correspondence between a TTI in which the UL grant-1 is borne and a TTI in which uplink data is sent, that uplink data needs to be sent to the eNodeB in the fourth TTI.

Further, if the UE determines that the channel on the unlicensed spectrum is idle in the fourth TTI, the UE sends, in the fourth TTI by using a channel of a licensed spectrum used by this system (a CC on a licensed spectrum), a notification message (for example, Valid transmission) that the UE can occupy the channel on the unlicensed spectrum in the fourth TTI, and sends uplink data to the eNodeB in the fourth TTI by using the channel on the unlicensed spectrum.

After receiving the UL grant-2 that is sent by the eNodeB in the first TTI, the UE determines, according to a correspondence between a TTI in which the UL grant-2 is sent and a TTI in which uplink data is sent, that uplink data needs to be sent to the eNodeB in the fifth TTI.

Further, if the UE determines that the channel on the unlicensed spectrum is not idle in the fifth TTI, the UE sends, in the fifth TTI by using a channel of a licensed spectrum used by this system (a CC on a licensed spectrum), a notification message (for example, Invalid transmission) that the UE cannot occupy the channel on the unlicensed spectrum in the fifth TTI, and does not send uplink data to the eNodeB in the fourth TTI by using the channel on the unlicensed spectrum.

If after receiving the Valid transmission notification message that is sent by the UE in the fourth TTI, the eNodeB determines that the UE sends uplink data in the fourth TTI by using the channel on the unlicensed spectrum, the eNodeB receives the uplink data. If after receiving the Invalid transmission notification message that is sent by the UE in the fifth TTI, the eNodeB determines that the UE cannot occupy the channel on the unlicensed spectrum in the fifth TTI, the eNodeB does not receive or does not demodulate data that is transmitted in the fifth TTI by using the channel on the unlicensed spectrum.

Further, the eNodeB may further send, to the UE according to a preset time interval, a reply representing whether uplink data is received or whether uplink data is correctly received, for example, reply, in the eighth TTI, to the UE with that uplink data is received in the fourth TTI (for example, Valid physical uplink shared channel (PUSCH) received), and reply, in the ninth TTI, to the UE with that uplink data is not received in the fifth TTI (for example, Invalid PUSCH received).

Embodiment 3

Figure 6:
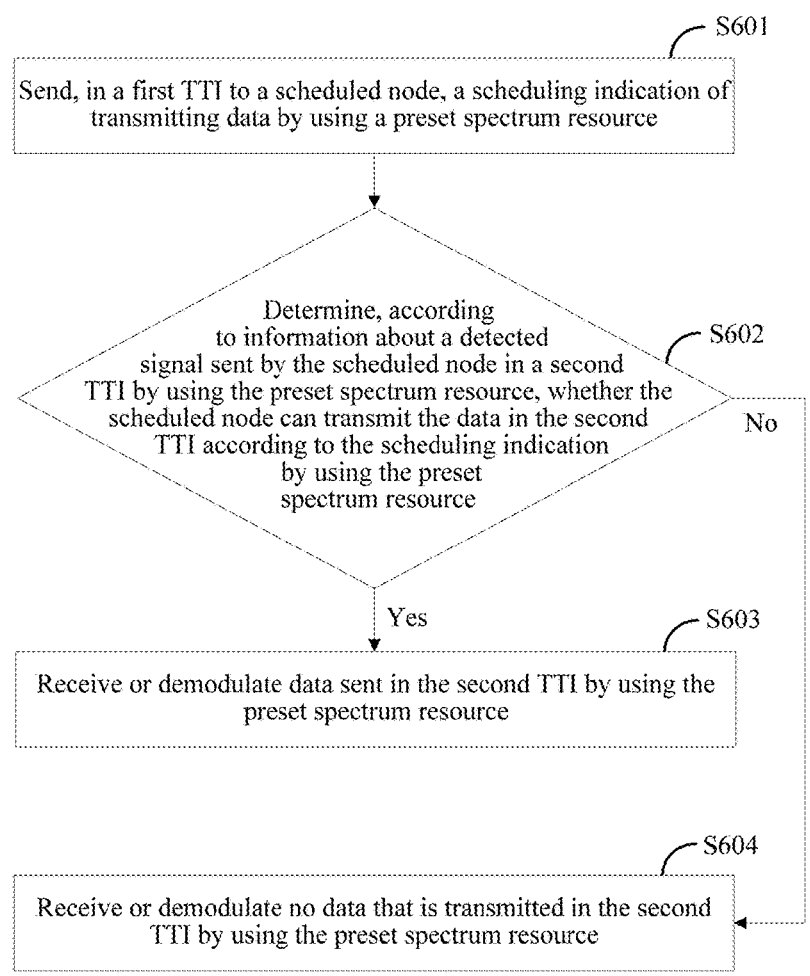
FIG. 6 is a flowchart of a data transmission method according to Embodiment 3 of the present disclosure.

In Embodiment 3 of the present disclosure, a data transmission method is provided. In Embodiment 3, a second TTI and a first TTI have a preset fixed time sequence relationship, and a second implementation manner is provided for step S102 described above. The method is applied to a scheduling node, and as shown in FIG. 6, specifically include the following steps:

S601: Send, in a first TTI to a scheduled node, a scheduling indication of transmitting data by using a preset spectrum resource, where the preset spectrum resource has the following characteristics: a use status of the preset spectrum resource needs to be sensed before the preset spectrum resource is occupied, and an occupation time for which the preset spectrum resource is occupied each time is limited.

S602: Determine, according to information about a detected signal sent by the scheduled node in a second TTI by using the preset spectrum resource, whether the scheduled node can transmit the data in the second TTI according to the scheduling indication by using the preset spectrum resource; and if yes, enter step S603; or if no, enter step S604.

In this step, the information about the signal sent by the scheduled node may be energy of the signal transmitted in the second TTI by using the preset spectrum resource, or a reference sequence that is sent by the scheduled node and that is agreed on in advance with the scheduling node, and therefore, the scheduling node may detect, in multiple manners, whether the scheduled node sends data in the second TTI by using the preset spectrum resource, and two detection manners are described below:

First manner: Energy of data sent by the scheduled node in the second TTI by using the preset spectrum resource is detected; and when the detected energy is greater than a first threshold, it is determined that the scheduled node transmits data in the second TTI according to the scheduling indication by using the preset spectrum resource.

In the first manner, the scheduling node may detect, on a radio resource (for example, the second TTI) scheduled by the scheduled node, energy of data sent by the scheduled node. If the scheduling node detects that the energy of the sent data exceeds the first threshold, it may be determined that the scheduled node performs data transmission according to the received scheduling indication, or if the scheduling node detects that the energy of the sent data does not exceed the first threshold, it may be determined that the scheduled node does not perform data transmission according to the received scheduling indication.

Second manner: A preset reference sequence that is sent by the scheduled node in the second TTI by using the preset spectrum resource is detected by means of sequence correlation; and when it is detected that an amplitude of the received preset reference sequence is greater than a second threshold, it is determined that the scheduled node transmits data in the second TTI according to the scheduling indication by using the preset spectrum resource.

In the second manner, the scheduling node may detect, by means of sequence correlation, a preset reference sequence correspondingly sent by the scheduled node, where the preset reference sequence is a reference sequence agreed on in advance between the scheduled node and the scheduling node, and may be a conventional sequence, for example, a data demodulation reference signal, or may be a specially designed sequence agreed on in advance between the scheduled node and the scheduling node, and the preset reference sequence may be sent in a TTI, in which data is sent, by using a resource for sending data. If it is detected by means of sequence correlation that an amplitude of the preset reference sequence correspondingly sent by the scheduled node exceeds the second threshold, it is determined that the scheduled node performs data transmission according to the received scheduling indication, or if it is detected by means of sequence correlation that an amplitude of the preset reference sequence correspondingly sent by the scheduled node does not exceed the second threshold, it may be determined that the scheduled node does not perform data transmission according to the received scheduling indication.

Further, detection manners for other types of indication of information in the prior art may also be used for the present disclosure.

S603: When it is determined, according to the information about the detected signal that is sent by the scheduled node in the second TTI by using the preset spectrum resource, that the scheduled node can transmit the data in the second TTI according to the scheduling indication by using the preset spectrum resource, receive or demodulate data sent in the second TTI by using the preset spectrum resource. This process ends.

S604: When it is determined, according to the information about the detected signal that is sent by the scheduled node in the second TTI by using the preset spectrum resource, that the scheduled node cannot transmit the data in the second TTI according to the scheduling indication by using the preset spectrum resource, receive or demodulate no data sent in the second TTI by using the preset spectrum resource. This process ends.

Embodiment 4

Figure 7:
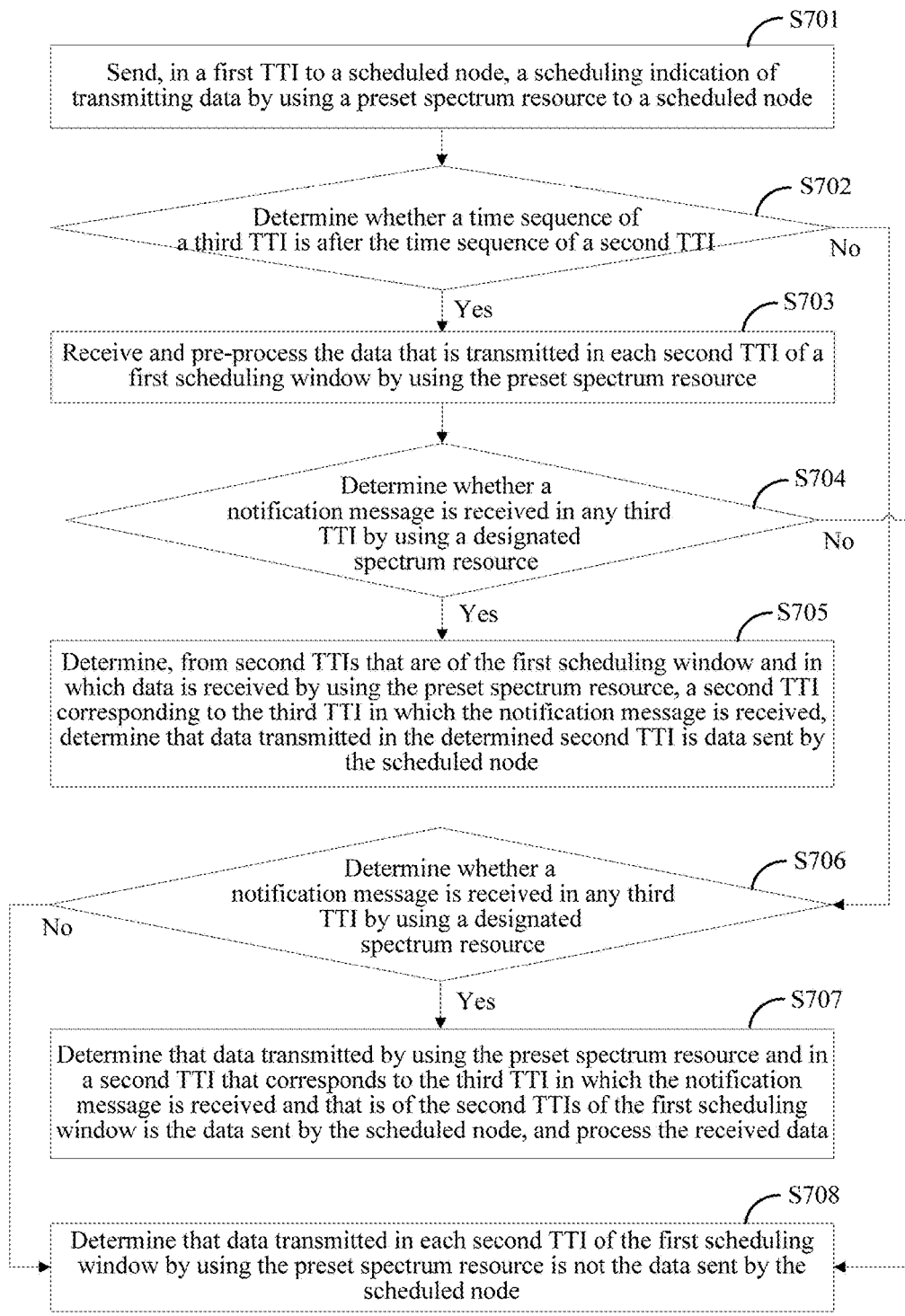
FIG. 7 is a flowchart of a data transmission method according to Embodiment 4 of the present disclosure.

In Embodiment 4 of the present disclosure, a data transmission method is provided. In Embodiment 4, a second TTI is any TTI of multiple TTIs of a preset first scheduling window, or a second TTI is any TTI of multiple TTIs of a first scheduling window indicated by a scheduling indication. A third implementation manner is provided for step S102 described above, and the method is applied to a scheduling node, and as shown in FIG. 7, specifically includes the following steps:

S701: Send, in a first TTI to a scheduled node, a scheduling indication of transmitting data by using a preset spectrum resource, where the preset spectrum resource has the following characteristics: a use status of the preset spectrum resource needs to be sensed before the preset spectrum resource is occupied, and an occupation time for which the preset spectrum resource is occupied each time is limited.

In step S702 to step S708 described below, it is determined whether a notification message sent by the scheduled node is received in any third TTI in a second scheduling window by using a designated spectrum resource, where the notification message is used to indicate that the scheduled node can occupy the preset spectrum resource in the second TTI, the designated spectrum resource is a spectrum resource allocated to and used by a wireless communications system at which the scheduled node is located, third TTIs in the second scheduling window, and second TTIs in the first scheduling window are in a one-to-one correspondence and each third TTI and a second TTI corresponding to the third TTI have a preset fixed time sequence relationship.

S702: Determine whether a time sequence of a third TTI is after the time sequence of a second TTI, and if yes, enter step S703; or if no, enter step S706.

Further, a time sequence correspondence between the first TTI and the second TTI may be preset, the second TTI is any TTI of multiple TTIs (preferable, may be multiple continuous TTIs) whose time sequence is after that of the first TTI, and the multiple TTIs form the first scheduling window. That is, a start TTI of the first scheduling window and a length of the first scheduling window may be preset. By using LTE as an example, when the first TTI is a subframe #n, the second TTI may be any TTI of a subframe #n+4 to a subframe #n+10, that is, the subframe #n+4 to the subframe #n+10 form the first scheduling window. The time sequence correspondence between the first TTI and the second TTI may also be indicated by the scheduling indication. During specific implementation, the start TTI of the first scheduling window and the length of the first scheduling window may be indicated in the scheduling indication sent by the scheduling node to the scheduled node.

Further, the second scheduling window includes multiple third TTIs, and the third TTIs and second TTIs in the first scheduling window are in a one-to-one correspondence and each third TTI and a second TTI corresponding to the third TTI have a preset fixed time sequence relationship. A time sequence of a third TTI may be after the time sequence of a second TTI corresponding to the third TTI, or may be before the time sequence of a second TTI corresponding to the third TTI, or may be the same as the time sequence of a second TTI corresponding to the third TTI. That a time sequence relationship between the second TTI and the third TTI is fixed may refer to that the scheduled node sends, in the third TTI by using the designated spectrum resource, a notification message representing that the scheduled node can occupy the preset spectrum resource, and the scheduling node can learn which second TTI the current notification message representing that the scheduled node can occupy the preset spectrum resource is applied to. For example, if the subframe #n+4 to the subframe #n+10 form the first scheduling window, the second scheduling window may include the subframe #n+4 to the subframe #n+10, or a subframe #n+2 to a subframe #n+8, or a subframe #n+7 to a subframe #n+13 forms.

Further, the scheduled node may know a correspondence between time sequences of first TTIs and time sequences of multiple second TTIs in the first scheduling window by means of presetting, may also know the correspondence between the time sequences of the first TTIs and the time sequences of the multiple second TTIs in the first scheduling window by using the received scheduling indication, determine, after receiving the scheduling indication, the start TTI of the first scheduling window and the length of the first scheduling window (that is, second TTIs), and may detect a second TTI, of the multiple second TTIs, in which the preset spectrum resource is idle and may be used to send data to the scheduling node. If the second TTI of the available preset spectrum resource is detected, data may be transmitted in the detected second TTI, and a notification message is sent to the scheduling node according to a correspondence that is preset or indicated in the scheduling indication, that is commonly known by both the scheduled node and the scheduling node, and that is between the first scheduling window and the second scheduling window, and in a third TTI that is in the channel of the designated spectrum resource and that has a fixed time sequence relationship with the second TTI in which data is transmitted and that is in the channel of the preset spectrum resource. If no second TTI of the available preset spectrum resource is detected, no data is sent to the scheduling node, and no notification message is sent to the scheduling node; or no data is sent to the scheduling node, and a notification message that the preset channel is unsuccessfully occupied is sent to the scheduling node in a third TTI corresponding to each second TTI in the first scheduling window by using the designated spectrum resource.

S703: When a time sequence of each third TTI in a second scheduling window is after the time sequence of a second TTI corresponding to the third TTI, receive and pre-process data that is transmitted in each second TTI of a first scheduling window by using the preset spectrum resource.

In this step, when the time sequence of each third TTI in the second scheduling window is after the time sequence of a second TTI corresponding to the third TTI, it is assumed that the scheduled node can occupy any second TTI of the channel of the preset spectrum resource. The any second TTI arrives earlier than a third TTI corresponding to the second TTI, and therefore, if data in the second TTI corresponding to the third TTI is not received until a notification message in the third TTI is received, it is late. Therefore, the scheduling node is enabled to receive, when the second TTI arrives, data transmitted in the second TTIs by using the preset spectrum resource, and first pre-processes the received data. For a specific process, refer to step S303 described above, and details are not described herein again.

S704: Determine whether a notification message is received in any third TTI by using a designated spectrum resource, and if yes, enter step S705; or if no, enter step S708.

S705: When a notification message is received in any third TTI in the second scheduling window by using the designated spectrum resource, determine, from second TTIs that are of the first scheduling window and in which data is received by using the preset spectrum resource, a second TTI corresponding to the third TTI in which the notification message is received, determine that data transmitted in the determined second TTI is data sent by the scheduled node and perform further processing on the data. This process ends.

In this step, if the subframe #n+4 to the subframe #n+10 form the first scheduling window, a subframe #n+5 to a subframe #n+11 form the second scheduling window and are in a one-to-one correspondence with the subframe #n+4 to the subframe #n+10, data in the subframe #n+4 to the subframe #n+10 is received, and a message that the channel of the preset spectrum resource is occupied successfully is received in a subframe #n+6 of the designated spectrum resource, it is determined that data in the subframe #n+5 (the second TTI) that corresponds to the subframe #n+6 (the third TTI) and that is on the preset spectrum resource is data sent by the scheduled node, further processing is performed on the data, and in other the second TTIs data received (in the subframe #n+4, and the subframe #n+6 to the subframe #n+10 on the channel of the preset spectrum resource) may be discarded.

S706: When a time sequence of each third TTI in the second scheduling window is not after the time sequence of a second TTI corresponding to the third TTI, determine whether a notification message is received in any third TTI by using the designated spectrum resource, and if yes, enter step S707; or if no, enter step S708.

In this step, on a scheduling node side, the scheduling node may determine, by detecting whether a notification message representing that the scheduled node occupies the channel of the preset spectrum resource successfully is received in the third TTIs that correspond to the second TTIs of the first scheduling window and that are in the designated spectrum resource, whether the data sent by the scheduled node needs to be received from the channel of the preset spectrum resource.

S707: When a time sequence of each third TTI in the second scheduling window is not after the time sequence of a second TTI corresponding to the third TTI, and a notification message is received in any third TTI in the second scheduling window by using the designated spectrum resource, determine that data transmitted by using the preset spectrum resource and in a second TTI that corresponds to the third TTI in which the notification message is received and that is of the second TTIs of the first scheduling window is the data sent by the scheduled node, and process the received data.

In this step, when a notification message is received in any third TTI corresponding to each second TTI of the first scheduling window by using the designated spectrum resource, a second TTI that corresponds to a third TTI and that is in the first scheduling window of the preset spectrum resource is first determined, and then data is received by using the determined second TTI. By using LTE as an example, if the first TTI is a subframe #n, the second TTI is any TTI of the subframe #n+4 to the subframe #n+10, the third TTI is any TTI of the subframe #n+6 to the subframe #n+12, and the eNodeB receives, in a subframe #n+6 of a PUSCH, a notification message that is sent by the scheduled node and that an unlicensed spectrum resource is occupied successfully, data sent by the scheduled node to the scheduling node may be received by using a subframe #n+4 of the unlicensed spectrum resource.

S708: When no notification message is received in any third TTI in the second scheduling window by using the designated spectrum resource, determine that data transmitted in each second TTI of the first scheduling window by using the preset spectrum resource is not the data sent by the scheduled node.

Embodiment 5

Figure 8:
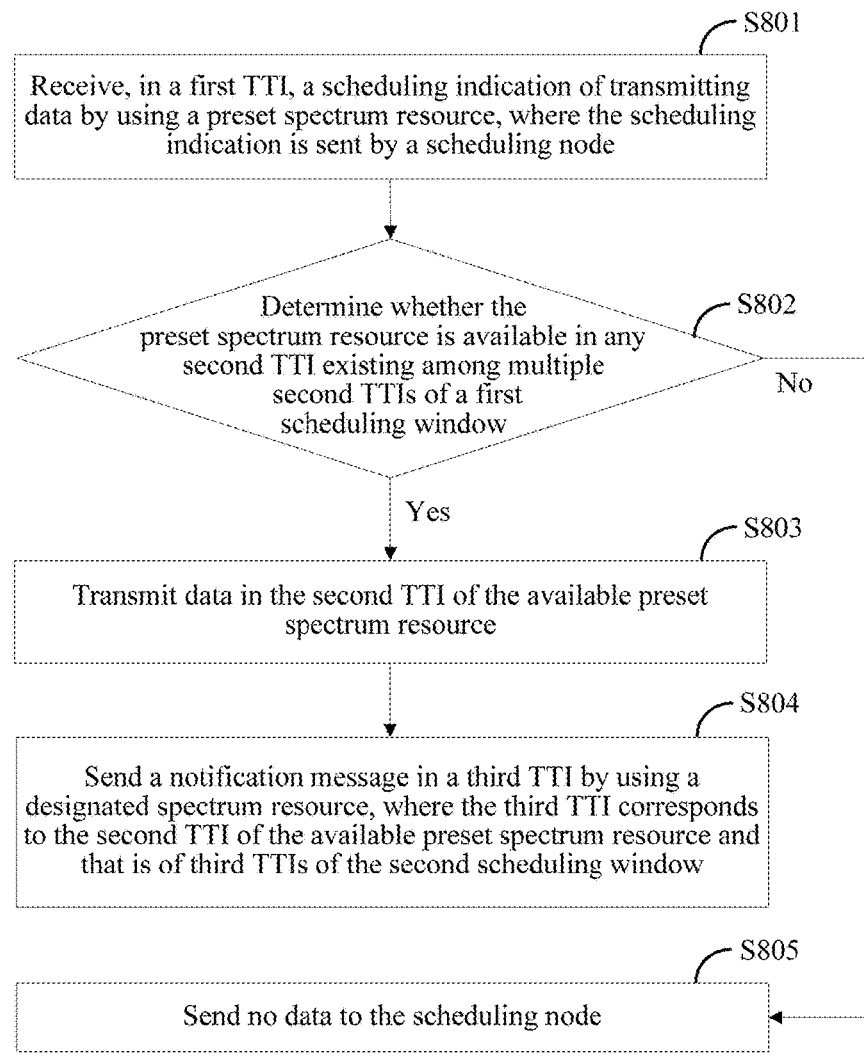
FIG. 8 is a flowchart of a data transmission method according to Embodiment 5 of the present disclosure.

Corresponding to Embodiment 4, in Embodiment 5 of the present disclosure, a data transmission method is provided, applied to a scheduled node side, and as shown in FIG. 8, specifically includes the following steps:

S801: Receive, in a first TTI, a scheduling indication of transmitting data by using a preset spectrum resource, where the scheduling indication is sent by a scheduling node, where the preset spectrum resource has the following characteristics: a use status of the preset spectrum resource needs to be sensed before the preset spectrum resource is occupied, and an occupation time for which the preset spectrum resource is occupied each time is limited.

S802: Determine whether the preset spectrum resource is available in any second TTI existing among multiple second TTIs of a first scheduling window, and if yes, enter step S803; or if no, enter step S805.

Further, the first scheduling window may be used to limit a time range in which a scheduled node sends data to the scheduling node, and in some cases, it cannot be ensured that any second TTI in the first scheduling window can be used to transmit data to the scheduling node. By using LTE as an example, it is assumed that a first TTI is a subframe #n, a second TTI is any TTI of a subframe #n+4 to a subframe #n+10, and UE needs to determine, from the first scheduling window, a second TTI in which the preset spectrum resource is idle and a second TTI that can be used to transmit uplink data, if a subframe #n+7 is idle, but the subframe #n+7 is a downlink subframe, the UE cannot transmit uplink data to an eNodeB by using the subframe #n+7.

S803: When it is determined that the preset spectrum resource is available in any second TTI existing among multiple second TTIs of the first scheduling window, transmit data in the second TTI of the available preset spectrum resource.

S804: Send a notification message in a third TTI by using a designated spectrum resource, where the third TTI corresponds to the second TTI of the available preset spectrum resource and that is of third TTIs of a second scheduling window, where the notification message is used to indicate that the scheduled node can occupy the preset spectrum resource in the second TTI, the designated spectrum resource is a spectrum resource allocated to and used by a wireless communications system at which the scheduling node is located, third TTIs in the second scheduling window, and second TTIs in the first scheduling window are in a one-to-one correspondence and each third TTI and a second TTI corresponding to the third TTI have a preset fixed time sequence relationship.

Further, when a determining result in S803 is yes, step S804 may be first performed, that is, a third TTI that has a fixed relationship with the second TTI of the available preset spectrum resource of the first window and that is of the third TTIs of the second scheduling window is determined, a notification message that the channel of the preset spectrum resource is occupied successfully is sent in the third TTI by using the designated spectrum resource, and then data is transmitted in the second TTI of the available preset spectrum resource.

S805: When it is determined that the preset spectrum resource is not available in the any second TTI existing among the multiple second TTIs of the first scheduling window, send no data to the scheduling node.

Further, when a determining result in S803 is no, no data may be sent to the scheduling node, and no notification message may be sent to the scheduling node; or no data is sent to the scheduling node, and a notification message that the channel of the preset spectrum resource is unsuccessfully occupied is sent to the scheduling node in a third TTI corresponding to each second TTI, of the available preset spectrum resource, in the first scheduling window by using the designated spectrum resource.

Embodiment 6

Figure 9:
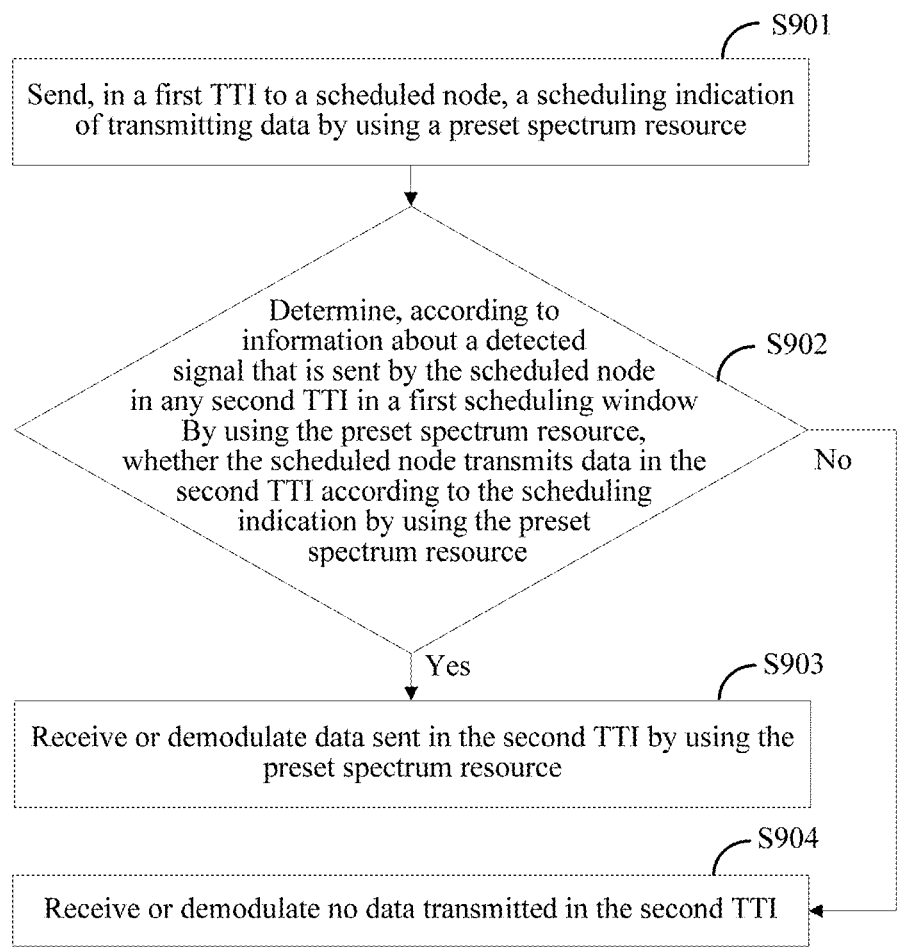
FIG. 9 is a flowchart of a data transmission method according to Embodiment 6 of the present disclosure.

In Embodiment 6 of the present disclosure, a data transmission method is provided. In Embodiment 6, a second TTI is any TTI of multiple TTIs of a preset first scheduling window, or a second TTI is any TTI of multiple TTIs of a first scheduling window indicated by a scheduling indication. A fourth implementation manner is provided for step S102 described above, and the method is applied to a scheduling node side, and as shown in FIG. 9, specifically includes the following steps:

S901: Send, in a first TTI to a scheduled node, a scheduling indication of transmitting data by using a preset spectrum resource, where the preset spectrum resource has the following characteristics: a use status of the preset spectrum resource needs to be sensed before the preset spectrum resource is occupied, and an occupation time for which the preset spectrum resource is occupied each time is limited.

S902: Determine, according to information about a detected signal that is sent by the scheduled node in any second TTI in a first scheduling window by using the preset spectrum resource, whether the scheduled node transmits data in the second TTI according to the scheduling indication by using the preset spectrum resource, and if yes, entering step S903; or if no, enter step S904.

In this step, whether service data is sent in any second TTI of the first scheduling window by using the channel of the preset spectrum resource may be detected by using the detection method provided in Embodiment 3 or another detection method in the prior art.

Further, when first TTIs used to send scheduling indications for different scheduled nodes respectively correspond, in time sequences, to second TTIs that have a same time sequence and that are in the first scheduling window, and when first TTIs used to send different scheduling indications for a same scheduled node respectively correspond, in time sequences, to second TTIs that have a same time sequence and that are in the first scheduling window, resource allocation is performed, by using different preset spectrum resources, for the first scheduling window whose second TTIs have the same time sequence, where the preset spectrum resource may include a frequency domain resource, a space domain resource, and a code domain resource.

That is, either first TTIs in which scheduling indications of different scheduled nodes are sent or first TTIs in which different scheduling indications of a same scheduled node are sent correspond to multiple second TTIs, that is, a first scheduling window. If there are first scheduling windows that have an overlapping relationship, that is, an overlapping part in the first scheduling windows is substantially a same preset spectrum resource, when detecting that the preset spectrum resource is available, multiple scheduled nodes or a same scheduling node needs to preempt the preset spectrum resource for data of multiple scheduling indications, and even if detecting data transmitted in a first scheduling window, the scheduling node cannot identify a scheduled node which sends the data, or a scheduling indication for which a scheduled node sends the data. Therefore, when a case in which first scheduling windows overlap occurs, the scheduling node may avoid the foregoing preemption case by allocating different preset spectrum resources to the overlapping first scheduling windows. By using LTE as an example, if for first UE, a first TTI is a subframe #n, and second TTIs are subframe #n+4 to subframe #n+10, and for second UE, a first TTI is a subframe #n+1, and second TTIs are subframe #n+5 to subframe #n+11, a first scheduling window of the first UE is the subframe #n+4 to the subframe #n+10, and a first scheduling window of the second UE is the subframe #n+5 to the subframe #n+11. It can be seen that, the subframe #n+5 to the subframe #n+10 in the first scheduling window of the first UE and those of the second UE are overlapping, and an overlapping problem of the first scheduling windows may be resolved by using different preset spectrum resources. For example, the first scheduling windows of the two are separately located on different frequency domains, or the first scheduling windows of the two are separately located on different space domains, or the first scheduling windows of the two are separately located on different code domains.

Likewise, second TTIs and third TTIs are in a one-to-one correspondence, and therefore when multiple first scheduling windows overlap, second scheduling windows respectively corresponding to the multiple first scheduling windows also overlap, and then resource allocation may also be performed for the overlapping second scheduling windows by using different designated spectrum resources.

S903: When it is determined, according to the information about the detected signal that is sent by the scheduled node in any second TTI of the first scheduling window by using the preset spectrum resource, that the scheduled node transmits the data in the second TTI according to the scheduling indication by using the preset spectrum resource, receive or demodulate data sent in the second TTI by using the preset spectrum resource. This process ends.

S904: When it is determined, according to the information about the detected signal that is sent by the scheduled node in any second TTI of the first scheduling window by using the preset spectrum resource, that the scheduled node transmits no data in the second TTI according to the scheduling indication by using the preset spectrum resource, receive or demodulate no data transmitted in the second TTI. This process ends.

Embodiment 7

Figure 10:
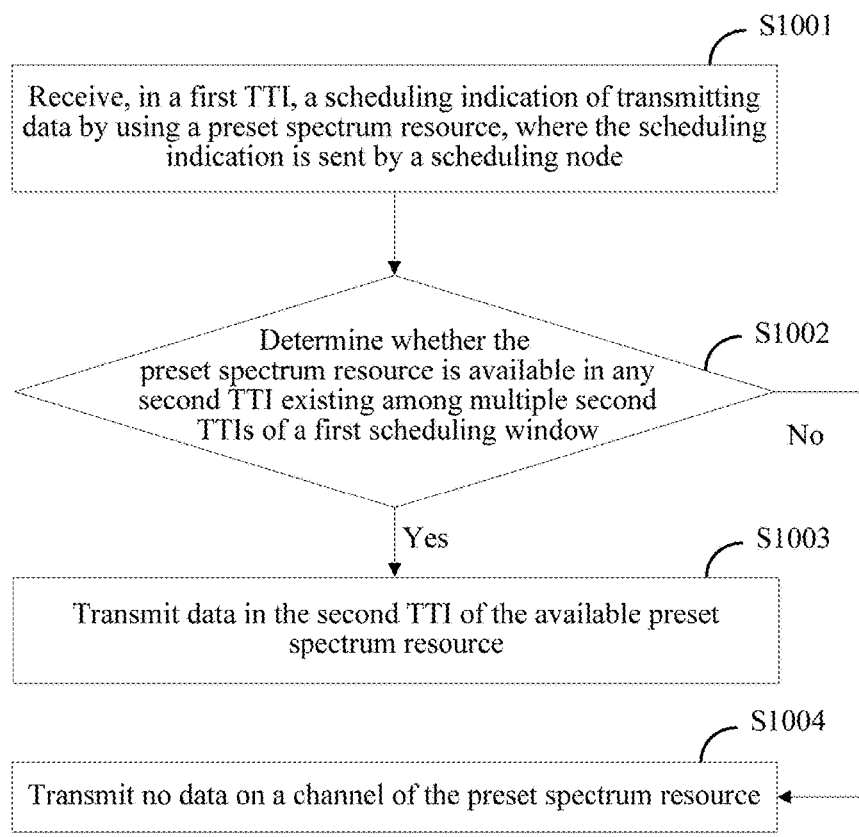
FIG. 10 is a flowchart of a data transmission method according to Embodiment 7 of the present disclosure.

Corresponding to Embodiment 6, in Embodiment 7 of the present disclosure, a data transmission method is provided, applied to a scheduled node, and as shown in FIG. 10, specifically includes the following steps:

S1001: Receive, in a first TTI, a scheduling indication of transmitting data by using a preset spectrum resource, where the scheduling indication is sent by a scheduling node, where the preset spectrum resource has the following characteristics: a use status of the preset spectrum resource needs to be sensed before the preset spectrum resource is occupied, and an occupation time for which the preset spectrum resource is occupied each time is limited.

S1002: Determine whether the preset spectrum resource is available in any second TTI existing among multiple second TTIs of a first scheduling window, and if yes, enter step S1003; or if no, enter step S1004.

S1003: When it is determined that the preset spectrum resource is available in any second TTI existing among multiple second TTIs of the first scheduling window, transmit data in the second TTI of the available preset spectrum resource. This process ends.

S1004: When it is determined that the preset spectrum resource is not available in the any second TTI existing among the multiple second TTIs of the first scheduling window, transmit no data on a channel of the preset spectrum resource. This process ends.

Figure 11:
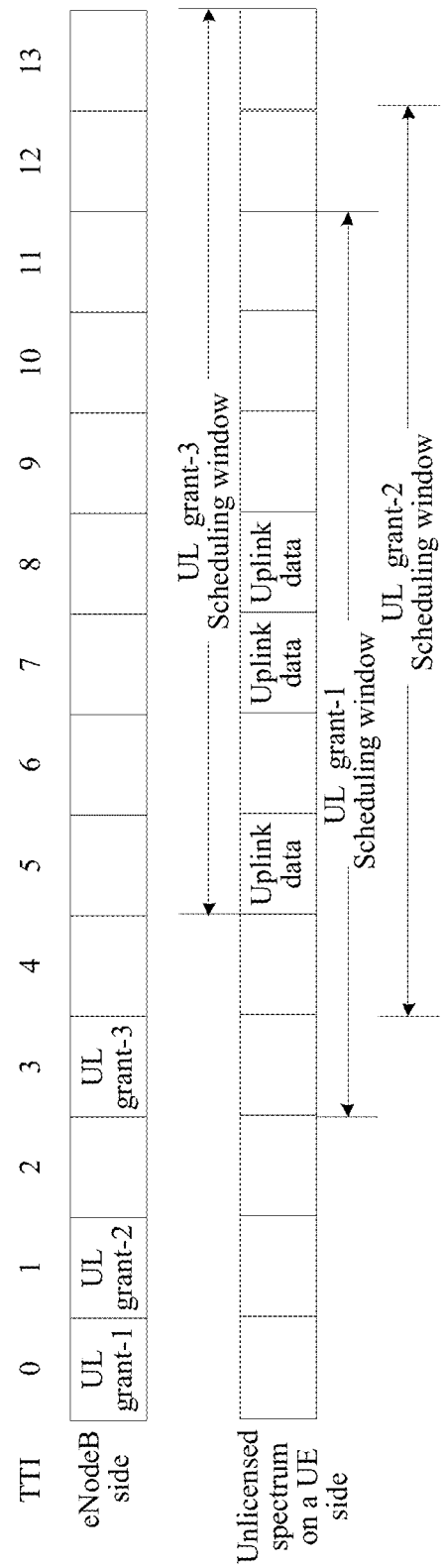
FIG. 11 is a schematic diagram of resource occupation of a data transmission method according to an example 2 of the present disclosure.

By using an LTE system as an example below, the data transmission methods provided in Embodiment 6 and Embodiment 7 are exemplified by using an example 2:

Example 2: it is assumed that in an LTE system, an eNodeB is used as a scheduling node, and UE is used as a scheduled node. As shown in FIG. 11, the eNodeB sends an uplink scheduling indication (UL grant-1), a UL grant-2 and a UL grant-3 to the UE in the zeroth TTI, the first TTI and the third TTI respectively, to instruct the UE to send uplink data by using a channel on an unlicensed spectrum (a CC on an unlicensed spectrum). The zeroth TTI corresponds to the third to the eleventh TTIs (that is, a first scheduling window of the UL grant-1), the first TTI corresponds to the fourth to the twelfth TTIs (that is, a first scheduling window of the UL grant-2), and the second TTI corresponds to the fifth to the thirteenth TTIs (that is, a first scheduling window of the UL grant-3). The foregoing three first scheduling windows have overlapping TTIs, and therefore, resource allocation is performed for the three scheduling windows by using different wireless communications resources.

After receiving the UL grant-1 that is sent by the eNodeB in the zeroth TTI, the UE detects, according to a correspondence between a TTI in which the UL grant-1 is sent and a TTI in which uplink data is sent (the first scheduling window of the UL grant-1), whether an idle uplink TTI exists among the third to the eleventh TTIs of the first scheduling window of the UL grant-1, and if an obtained detection result is that the fifth TTI is an idle uplink TTI, uplink data for the UL grant-1 is sent to the eNodeB in the fifth TTI by using the channel on the unlicensed spectrum.

After receiving the UL grant-2 that is sent by the eNodeB in the first TTI, the UE detects, according to a correspondence between a TTI in which the UL grant-1 is sent and a TTI in which uplink data is sent (the first scheduling window of the UL grant-2), whether an idle uplink TTI exists among the fourth to the twelfth TTIs of the first scheduling window of the UL grant-2, and if an obtained detection result is that the seventh TTI is an idle uplink TTI, uplink data for the UL grant-2 is sent to the eNodeB in the seventh TTI by using the channel on the unlicensed spectrum.

After receiving the UL grant-3 that is sent by the eNodeB in the second TTI, the UE detects, according to a correspondence between a TTI in which the UL grant-3 is sent and a TTI in which uplink data is sent (the first scheduling window of the UL grant-3), whether an idle uplink TTI exists among the fifth to the thirteenth TTIs of the first scheduling window of the UL grant-3, and if an obtained detection result is that the eighth TTI is an idle uplink TTI, uplink data for the UL grant-3 is sent to the eNodeB in the eighth TTI by using the channel on the unlicensed spectrum.

After sending three scheduling indications, the eNodeB performs uplink signal detection in first scheduling windows respectively corresponding to the three scheduling indications, and determines whether the UE sends data in a scheduling window, and if detecting uplink data sent by the UE, the eNodeB receives the uplink data; otherwise, receives or demodulates no data transmitted in the first scheduling window.

Based on a same inventive idea, embodiments of the present disclosure further provide a data transmission device and system. A principle on which the device and system resolve a problem is similar to that of the foregoing data transmission method, and therefore, for implementation of the device and system, refer to implementation of the foregoing method, and repetitive descriptions are not made herein again.

Figure 12:
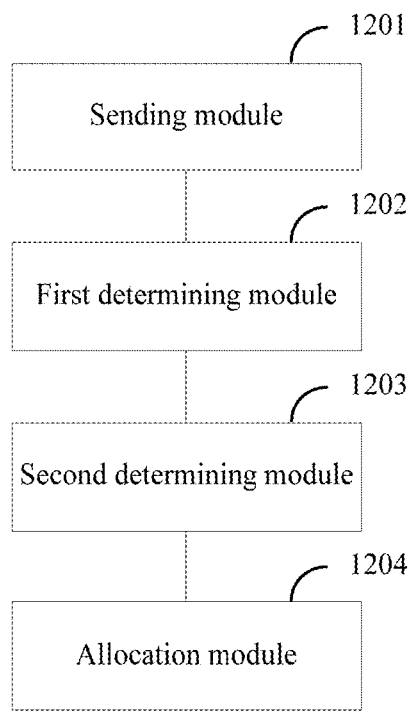
FIG. 12 is a schematic structural diagram of a data transmission device 1 according to an embodiment of the present disclosure.

A data transmission device 1 provided in an embodiment of the present disclosure, as shown in FIG. 12, includes the following modules.

a sending module 1201, configured to send, in a first transmission time interval TTI to a scheduled node, a scheduling indication of transmitting data by using a preset spectrum resource, where the preset spectrum resource has the following characteristics: a use status of the preset spectrum resource needs to be sensed before the preset spectrum resource is occupied, and an occupation time for which the preset spectrum resource is occupied each time is limited;

a first determining module 1202, configured to determine that the scheduled node can transmit data in a second TTI according to the scheduling indication by using the preset spectrum resource, where the scheduling indication is sent by the sending module 1201, where the second TTI is a TTI used to send the data that is transmitted by the scheduled node according to the scheduling indication, and the second TTI is a TTI that is after the first TTI in a time sequence and that has a preset time sequence relationship with the first TTI; and a second determining module 1203, configured to: after the first determining module 1202 determines that the scheduled node can transmit data in the second TTI according to the scheduling indication by using the preset spectrum resource, where the scheduling indication is sent by the sending module, determine that the data that is transmitted in the second TTI by using the preset spectrum resource is data sent by the scheduled node.

Further, the first determining module 1202 is specifically configured to determine that a notification message sent by the scheduled node is received in a third TTI by using a designated spectrum resource, where the notification message is used to indicate that the scheduled node can occupy the preset spectrum resource in the second TTI, the designated spectrum resource is a spectrum resource allocated to and used by a wireless communications system at which the scheduled node is located, the third TTI is a TTI whose time sequence is not after the time sequence of the second TTI, and the second TTI and the first TTI have a preset fixed time sequence relationship.

Further, the first determining module 1202 is further configured to: before it is determined that the scheduled node can transmit data in a second TTI according to the scheduling indication by using the preset spectrum resource, receive and pre-process the data that is transmitted in the second TTI by using the preset spectrum resource; and the first determining module 1202 is specifically configured to determine that a notification message sent by the scheduled node is received in a third TTI by using a designated spectrum resource, where the notification message is used to indicate that the scheduled node can occupy the preset spectrum resource in the second TTI, the designated spectrum resource is a spectrum resource allocated to and used by a wireless communications system at which the scheduled node is located, the third TTI is a TTI whose time sequence is after the time sequence of the second TTI, and the second TTI and the first TTI have a preset fixed time sequence relationship; and receive, in the third TTI by using the designated spectrum resource, the notification message sent by the scheduled node.

Further, the first determining module 1202 is specifically configured to determine, according to information about a detected signal that is sent by the scheduled node in the second TTI by using the preset spectrum resource, that the scheduled node can transmit the data in the second TTI according to the scheduling indication by using the preset spectrum resource, where the second TTI and the first TTI have a preset fixed time sequence relationship.

Further, the first determining module 1202 is specifically configured to determine that a notification message sent by the scheduled node is received in any third TTI in a second scheduling window by using a designated spectrum resource, where the notification message is used to indicate that the scheduled node can occupy the preset spectrum resource in the second TTI, the designated spectrum resource is a spectrum resource allocated to and used by a wireless communications system at which the scheduled node is located, third TTIs in the second scheduling window and second TTIs in the first scheduling window are in a one-to-one correspondence, and a time sequence of each third TTI is not after the time sequence of a second TTI corresponding to the third TTI; and the second TTI is any TTI of multiple TTIs of a preset first scheduling window, or the second TTI is any TTI of multiple TTIs of a first scheduling window indicated by the scheduling indication; and the second determining module 1203 is specifically configured to determine that data that is transmitted in a second TTI by using the preset spectrum resource, where the second TTI corresponds to the third TTI in which the notification message is received and that is of the second TTIs of the first scheduling window is the data sent by the scheduled node.

Further, the first determining module 1202 is further configured to: before it is determined that the scheduled node can transmit data in a second TTI according to the scheduling indication by using the preset spectrum resource, receive and pre-process the data that is transmitted in each second TTI of the first scheduling window by using the preset spectrum resource;

the first determining module 1202 is specifically configured to determine that a notification message sent by the scheduled node is received in any third TTI in a second scheduling window by using a designated spectrum resource, where the notification message is used to indicate that the scheduled node can occupy the preset spectrum resource in the second TTI, the designated spectrum resource is a spectrum resource allocated to and used by a wireless communications system at which the scheduled node is located, third TTIs in the second scheduling window and second TTIs in the first scheduling window are in a one-to-one correspondence, and a time sequence of each third TTI is after the time sequence of a second TTI corresponding to the third TTI; and the second TTI is any TTI of multiple TTIs of a preset first scheduling window, or the second TTI is any TTI of multiple TTIs of a first scheduling window indicated by the scheduling indication; and the second determining module 1203 is specifically configured to determine, from the second TTIs of the first scheduling window in which data is received by using the preset spectrum resource, a second TTI corresponding to the third TTI in which the notification message is received; and determine that data transmitted in the determined second TTI is the data sent by the scheduled node.

Further, the first determining module 1202 is specifically configured to determine, according to information about a detected signal that is sent by the scheduled node in any second TTI in the first scheduling window by using the preset spectrum resource, that the scheduled node transmits the data in the second TTI according to the scheduling indication by using the preset spectrum resource, where the second TTI is any TTI of multiple TTIs of a preset first scheduling window, or the second TTI is any TTI of multiple TTIs of a first scheduling window indicated by the scheduling indication.

Further, the first determining module 1202 is specifically configured to detect energy of data sent by the scheduled node in the second TTI by using the preset spectrum resource; and when the detected energy is greater than a first threshold, determine that the scheduled node transmits data in the second TTI according to the scheduling indication by using the preset spectrum resource; or detect, by means of sequence correlation, a preset reference sequence that is sent by the scheduled node in the second TTI by using the preset spectrum resource; and when it is detected that an amplitude of the received preset reference sequence is greater than a second threshold, determine that the scheduled node transmits data in the second TTI according to the scheduling indication by using the preset spectrum resource.

Further, the device further includes: an allocation module 1204, where the allocation module 1204 is configured to: when first TTIs used by the sending module 1201 to send scheduling indications for different scheduled nodes respectively correspond, in time sequences, to second TTIs that have a same time sequence and that are in the first scheduling window, perform, by using different preset spectrum resources, resource allocation for the first scheduling window whose second TTIs have the same time sequence; and perform, by using different designated spectrum resources, resource allocation for the second scheduling window whose third TTIs have a same time sequence; or when first TTIs used by the sending module 1201 to send different scheduling indications for a same scheduled node respectively correspond, in time sequences, to second TTIs that have a same time sequence and that are in the first scheduling window, perform, by using different preset spectrum resources, resource allocation for the first scheduling window whose second TTIs have the same time sequence; and perform, by using different designated spectrum resources, resource allocation for the second scheduling window whose third TTIs have a same time sequence, where the preset spectrum resource or designated spectrum resource includes a frequency domain resource, a space domain resource, and a code domain resource.

Figure 13:
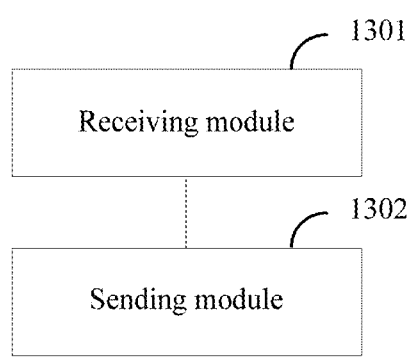
FIG. 13 is a schematic structural diagram of a data transmission device 2 according to an embodiment of the present disclosure.

A data transmission device 2 provided in an embodiment of the present disclosure, as shown in FIG. 13, includes the following modules.

a receiving module 1301, configured to receive, in a first transmission time interval TTI, a scheduling indication of transmitting data by using a preset spectrum resource, where the scheduling indication is sent by a scheduling node, where the preset spectrum resource has the following characteristics: a use status of the preset spectrum resource needs to be sensed before the preset spectrum resource is occupied, and an occupation time for which the preset spectrum resource is occupied each time is limited; and a sending module 1302, configured to: when it is determined that data can be transmitted in the second TTI according to the scheduling indication by using the preset spectrum resource, where the scheduling indication is received by the receiving module 1301, transmit data in the second TTI by using the preset spectrum resource, where the second TTI is a TTI used to send the data transmitted for the scheduling indication, and the second TTI is a TTI that is after the first TTI in a time sequence and that has a preset time sequence relationship with the first TTI.

Further, the sending module 1302 is specifically configured to: when it is determined that the preset spectrum resource is available in the second TTI, send a notification message in a third TTI by using a designated spectrum resource; and transmit data in the second TTI by using the preset spectrum resource, where the notification message is used to indicate that the scheduled node can occupy the preset spectrum resource in the second TTI, the designated spectrum resource is a spectrum resource allocated to and used by a wireless communications system at which the scheduling node is located, the third TTI is a TTI that has a preset time sequence relationship with the second TTI, and the second TTI and the first TTI have a preset fixed time sequence relationship.

Further, the sending module 1301 is specifically configured to: when it is determined that the preset spectrum resource is available in any second TTI existing among multiple second TTIs of the first scheduling window, transmit data in the second TTI of the available preset spectrum resource by using the preset spectrum resource, where the second TTI is any TTI of multiple TTIs of a preset first scheduling window; or the second TTI is any TTI of multiple TTIs of a first scheduling window indicated by the scheduling indication.

Further, the sending module 1301 is further configured to: when it is determined that data can be transmitted in the second TTI according to the scheduling indication by using the preset spectrum resource, send a notification message in a third TTI by using a designated spectrum resource, where the third TTI corresponds to the second TTI of the available preset spectrum resource and that is of third TTIs of a second scheduling window, where the notification message is used to indicate that the scheduled node can occupy the preset spectrum resource in the second TTI, the designated spectrum resource is a spectrum resource allocated to and used by a wireless communications system at which the scheduling node is located, third TTIs in the second scheduling window, and second TTIs in the first scheduling window are in a one-to-one correspondence and each third TTI and a second TTI corresponding to the third TTI have a preset fixed time sequence relationship.

A data transmission system provided in an embodiment of the present disclosure includes: the foregoing data transmission device 1 and the foregoing data transmission device 2.

Based on a same inventive idea, embodiments of the present disclosure further provide a data transmission device and system. A principle on which the device and system resolve a problem is similar to that of the foregoing data transmission method, and therefore, for implementation of the device and system, refer to implementation of the foregoing method, and repetitive descriptions are not made herein again.

Figure 14:
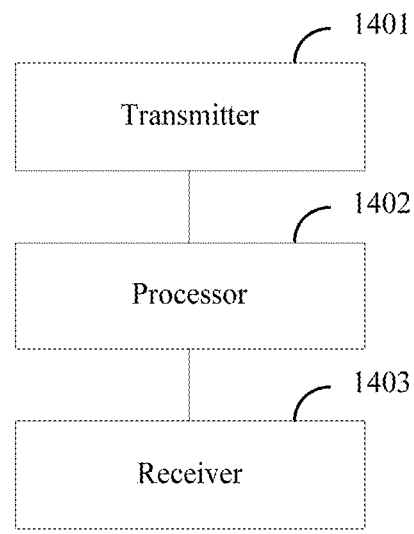
FIG. 14 is a schematic structural diagram of a data transmission device 3 according to an embodiment of the present disclosure.

A data transmission device 3 provided in an embodiment of the present disclosure, as shown in FIG. 14, includes the following components.

a transmitter 1401, configured to send, in a first transmission time interval TTI to a scheduled node, a scheduling indication of transmitting data by using a preset spectrum resource, where the preset spectrum resource has the following characteristics: a use status of the preset spectrum resource needs to be sensed before the preset spectrum resource is occupied, and an occupation time for which the preset spectrum resource is occupied each time is limited;

a processor 1402, configured to determine that the scheduled node can transmit data in a second TTI according to the scheduling indication, sent by the transmitter 1401, by using the preset spectrum resource; and determine that the data that is transmitted in the second TTI by using the preset spectrum resource is data sent by the scheduled node, where the second TTI is a TTI used to send the data that is transmitted by the scheduled node according to the scheduling indication, and the second TTI is a TTI that is after the first TTI in a time sequence and that has a preset time sequence relationship with the first TTI.

Further, the device further includes: a receiver 1403, where the receiver 1403 is configured to receive, in the third TTI by using the designated spectrum resource, the notification message sent by the scheduled node; and the processor 1402 is specifically configured to determine that the receiver 1403 receives, in the third TTI by using the designated spectrum resource, the notification message sent by the scheduled node, where the notification message is used to indicate that the scheduled node can occupy the preset spectrum resource in the second TTI, the designated spectrum resource is a spectrum resource allocated to and used by a wireless communications system at which the scheduled node is located, the third TTI is a TTI whose time sequence is not after the time sequence of the second TTI, and the second TTI and the first TTI have a preset fixed time sequence relationship.

Further, the device further includes: a receiver 1403, where the receiver 1403 is configured to: before the processor 1402 determines that the scheduled node can transmit data in a second TTI according to the scheduling indication by using the preset spectrum resource, receive and pre-process the data that is transmitted in the second TTI by using the preset spectrum resource; and receive, in the third TTI by using the designated spectrum resource, the notification message sent by the scheduled node; and the processor 1402 is specifically configured to determine that the receiver 1403 receives, in the third TTI by using the designated spectrum resource, the notification message sent by the scheduled node, where the notification message is used to indicate that the scheduled node can occupy the preset spectrum resource in the second TTI, the designated spectrum resource is a spectrum resource allocated to and used by a wireless communications system at which the scheduled node is located, the third TTI is a TTI whose time sequence is after the time sequence of the second TTI, and the second TTI and the first TTI have a preset fixed time sequence relationship; and receive, in the third TTI by using the designated spectrum resource, the notification message sent by the scheduled node.

Further, the processor 1402 is specifically configured to determine, according to information about a detected signal that is sent by the scheduled node in the second TTI by using the preset spectrum resource, that the scheduled node can transmit the data in the second TTI according to the scheduling indication by using the preset spectrum resource, where the second TTI and the first TTI have a preset fixed time sequence relationship.

Further, the device further includes: a receiver 1403, where the receiver 1403 is configured to receive, in any third TTI in the second scheduling window by using a designated spectrum resource, a notification message sent by the scheduled node;

the processor 1402 is specifically configured to determine that the receiver 1403 receives, in the any third TTI in the second scheduling window by using the designated spectrum resource, the notification message sent by the scheduled node, where the notification message is used to indicate that the scheduled node can occupy the preset spectrum resource in the second TTI, the designated spectrum resource is a spectrum resource allocated to and used by a wireless communications system at which the scheduled node is located, third TTIs in the second scheduling window and second TTIs in the first scheduling window are in a one-to-one correspondence, and a time sequence of each third TTI is not after the time sequence of a second TTI corresponding to the third TTI; and the second TTI is any TTI of multiple TTIs of a preset first scheduling window, or the second TTI is any TTI of multiple TTIs of a first scheduling window indicated by the scheduling indication; and the processor 1402 is specifically configured to determine that data that is transmitted in a second TTI by using the preset spectrum resource, where the second TTI corresponds to the third TTI in which the notification message is received and that is of the second TTIs of the first scheduling window is the data sent by the scheduled node.

Further, the device further includes: a receiver 1403, where the receiver 1403 is configured to: before the processor 1402 determines that the scheduled node can transmit data in a second TTI according to the scheduling indication by using the preset spectrum resource, receive and pre-process the data that is transmitted in each second TTI of the first scheduling window by using the preset spectrum resource;

the processor 1402 is specifically configured to determine that the receiver 1403 receives, in the any third TTI in the second scheduling window by using the designated spectrum resource, the notification message sent by the scheduled node, where the notification message is used to indicate that the scheduled node can occupy the preset spectrum resource in the second TTI, the designated spectrum resource is a spectrum resource allocated to and used by a wireless communications system at which the scheduled node is located, third TTIs in the second scheduling window and second TTIs in the first scheduling window are in a one-to-one correspondence, and a time sequence of each third TTI is after the time sequence of a second TTI corresponding to the third TTI; and the second TTI is any TTI of multiple TTIs of a preset first scheduling window, or the second TTI is any TTI of multiple TTIs of a first scheduling window indicated by the scheduling indication; and the processor 1402 is specifically configured to determine, from the second TTIs of the first scheduling window in which data is received by using the preset spectrum resource, a second TTI corresponding to the third TTI in which the notification message is received; and determine that data transmitted in the determined second TTI is the data sent by the scheduled node.

Further, the processor 1402 is specifically configured to determine, according to information about a detected signal that is sent by the scheduled node in any second TTI in the first scheduling window by using the preset spectrum resource, that the scheduled node transmits the data in the second TTI according to the scheduling indication by using the preset spectrum resource, where the second TTI is any TTI of multiple TTIs of a preset first scheduling window, or the second TTI is any TTI of multiple TTIs of a first scheduling window indicated by the scheduling indication.

Further, the processor 1402 is specifically configured to detect energy of data sent by the scheduled node in the second TTI by using the preset spectrum resource; and when the detected energy is greater than a first threshold, determine that the scheduled node transmits data in the second TTI according to the scheduling indication by using the preset spectrum resource; or detect, by means of sequence correlation, a preset reference sequence that is sent by the scheduled node in the second TTI by using the preset spectrum resource; and when it is detected that an amplitude of the received preset reference sequence is greater than a second threshold, determine that the scheduled node transmits data in the second TTI according to the scheduling indication by using the preset spectrum resource.

The processor 1402 is further configured to: when first TTIs used by the transmitter 1401 to send scheduling indications for different scheduled nodes respectively correspond, in time sequences, to second TTIs that have a same time sequence and that are in the first scheduling window, perform, by using different preset spectrum resources, resource allocation for the first scheduling window whose second TTIs have the same time sequence; and perform, by using different designated spectrum resources, resource allocation for the second scheduling window whose third TTIs have a same time sequence; or or when first TTIs used by the transmitter 1401 to send different scheduling indications for a same scheduled node respectively correspond, in time sequences, to second TTIs that have a same time sequence and that are in the first scheduling window, perform, by using different preset spectrum resources, resource allocation for the first scheduling window whose second TTIs have the same time sequence; and perform, by using different designated spectrum resources, resource allocation for the second scheduling window whose third TTIs have a same time sequence, where the preset spectrum resource or designated spectrum resource includes a frequency domain resource, a space domain resource, and a code domain resource.

Figure 15:
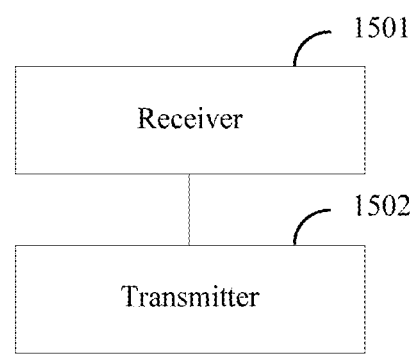
FIG. 15 is a schematic structural diagram of a data transmission device 4 according to an embodiment of the present disclosure.

A data transmission device 4 provided in an embodiment of the present disclosure, as shown in FIG. 15, includes the following components.

a receiver 1501, configured to receive, in a first transmission time interval TTI, a scheduling indication of transmitting data by using a preset spectrum resource, where the scheduling indication is sent by a scheduling node, where the preset spectrum resource has the following characteristics: a use status of the preset spectrum resource needs to be sensed before the preset spectrum resource is occupied, and an occupation time for which the preset spectrum resource is occupied each time is limited; and a transmitter 1502, configured to: when it is determined that data can be transmitted in the second TTI according to the scheduling indication by using the preset spectrum resource, where the scheduling indication is received by the receiver 1501, transmit data in the second TTI by using the preset spectrum resource, where the second TTI is a TTI used to send the data transmitted for the scheduling indication, and the second TTI is a TTI that is after the first TTI in a time sequence and that has a preset time sequence relationship with the first TTI.

Further, the transmitter 1502 is specifically configured to: when it is determined that the preset spectrum resource is available in the second TTI, send a notification message in a third TTI by using a designated spectrum resource; and transmit data in the second TTI by using the preset spectrum resource, where the notification message is used to indicate that the scheduled node can occupy the preset spectrum resource in the second TTI, the designated spectrum resource is a spectrum resource allocated to and used by a wireless communications system at which the scheduling node is located, the third TTI is a TTI that has a preset time sequence relationship with the second TTI, and the second TTI and the first TTI have a preset fixed time sequence relationship.

Further, the transmitter 1502 is specifically configured to: when it is determined that the preset spectrum resource is available in any second TTI existing among multiple second TTIs of the first scheduling window, transmit data in the second TTI of the available preset spectrum resource by using the preset spectrum resource, where the second TTI is any TTI of multiple TTIs of a preset first scheduling window; or the second TTI is any TTI of multiple TTIs of a first scheduling window indicated by the scheduling indication.

Further, the transmitter 1502 is further configured to: when it is determined that data can be transmitted in the second TTI according to the scheduling indication by using the preset spectrum resource, send a notification message in a third TTI by using a designated spectrum resource, where the third TTI corresponds to the second TTI of the available preset spectrum resource and that is of third TTIs of a second scheduling window, where the notification message is used to indicate that the scheduled node can occupy the preset spectrum resource in the second TTI, the designated spectrum resource is a spectrum resource allocated to and used by a wireless communications system at which the scheduling node is located, third TTIs in the second scheduling window, and second TTIs in the first scheduling window are in a one-to-one correspondence and each third TTI and a second TTI corresponding to the third TTI have a preset fixed time sequence relationship.

A data transmission system provided in an embodiment of the present disclosure includes: the foregoing data transmission device 3 and the foregoing data transmission device 4.

Functions of the foregoing units of may correspond to corresponding processing steps in processes shown in FIG. 1 to FIG. 4, and FIG. 6 to FIG. 10, and details are not described herein again.

According to a data transmission method, device and system provided in the embodiments of the present disclosure, a scheduling node sends, in a first TTI to a scheduled node, a scheduling indication of transmitting data by using a preset spectrum resource; after the scheduled node receives the scheduling indication, when it is determined that data can be transmitted in the second TTI according to the scheduling indication by using the preset spectrum resource, data is transmitted in the second TTI by using the preset spectrum resource; and when the scheduling node determines that the scheduled node can transmit data in the second TTI according to the scheduling indication by using the preset spectrum resource, it is determined that the data that is transmitted in the second TTI by using the preset spectrum resource is data sent by the scheduled node. According to the data transmission method provided in the embodiments of the present disclosure, after receiving a scheduling indication, a scheduled node needs to determine whether the scheduled node can transmit data according to the scheduling indication by using a second TTI of a channel of a preset spectrum resource. When a determining result is yes, the scheduled node transmits data according to the scheduling indication in the second TTI by using the channel of the preset spectrum resource, instead of a case in the prior art in which when determining that the channel of the preset spectrum resource is idle, the scheduled node sends, to a scheduling node, a notification that the scheduled node can occupy the channel of the preset spectrum resource, and continuously occupies the channel by sending random data on the channel of the preset spectrum resource, until receiving the scheduling indication and completing formal data transmission, so as to reduce a power loss of the scheduled node, and save a wireless communications resource. After sending a scheduling indication to a scheduled node, and before determining that data transmitted in a second TTI by using a channel of a preset spectrum resource is data transmitted by the scheduled node, a scheduling node needs to determine that the scheduled node can occupy the channel of the preset spectrum resource according to the scheduling indication. Compared with the prior art in which data is received regardless of whether the scheduled node successfully occupies the channel, it may be avoided that in a case in which the scheduled node does not send data according to the scheduling indication, the scheduling node saves or merges data that is not sent by the scheduled node and that is mistakenly received or demodulated from the channel of the preset spectrum resource into a soft storage area, so as to improve transmission efficiency of a wireless communications system.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A data transmission method, comprising:
sending, in a first transmission time interval (TTI) to a scheduled node, a scheduling indication of transmitting data by using a preset spectrum resource, wherein the preset spectrum resource has the following characteristics:
  a use status of the preset spectrum resource needs to be sensed before the preset spectrum resource is occupied, and
  an occupation time for which the preset spectrum resource is occupied each time is limited;
determining that the scheduled node can transmit data in a second TTI according to the scheduling indication by using the preset spectrum resource, wherein the second TTI is a TTI used to send the data that is transmitted by the scheduled node according to the scheduling indication, and the second TTI is a TTI that is after the first TTI in a time sequence and that has a preset time sequence relationship with the first TTI; and
determining that the data that is transmitted in the second TTI by using the preset spectrum resource is data sent by the scheduled node.

2. The method according to claim 1, wherein:
the second TTI and the first TTI have a preset fixed time sequence relationship; and
determining that the scheduled node can transmit data in a second TTI according to the scheduling indication by using the preset spectrum resource comprises:
  determining that a notification message sent by the scheduled node is received in a third TTI by using a designated spectrum resource, wherein the notification message indicates that the scheduled node can occupy the preset spectrum resource in the second TTI, the designated spectrum resource is a spectrum resource allocated to and used by a wireless communications system at which the scheduled node is located, and the third TTI is a TTI whose time sequence is not after the time sequence of the second TTI.

3. The method according to claim 1, wherein:
the second TTI and the first TTI have a preset fixed time sequence relationship;
before determining that the scheduled node can transmit data in a second TTI according to the scheduling indication by using the preset spectrum resource, the method further comprises:

receiving and pre-processing the data that is transmitted in the second TTI by using the preset spectrum resource; and determining that the scheduled node can transmit data in a second TTI according to the scheduling indication by using the preset spectrum resource comprises:

determining that a notification message sent by the scheduled node is received in a third TTI by using a designated spectrum resource, wherein the notification message indicates that the scheduled node can occupy the preset spectrum resource in the second TTI, the designated spectrum resource is a spectrum resource allocated to and used by a wireless communications system at which the scheduled node is located, and the third TTI is a TTI whose time sequence is after the time sequence of the second TTI.

4. The method according to claim 1, wherein:

the second TTI and the first TTI have a preset fixed time sequence relationship; and determining that the scheduled node can transmit data in a second TTI according to the scheduling indication by using the preset spectrum resource comprises:

determining, according to information about a detected signal that is sent by the scheduled node in the second TTI by using the preset spectrum resource, that the scheduled node can transmit the data in the second TTI according to the scheduling indication by using the preset spectrum resource.

5. The method according to claim 1, wherein:

the second TTI is any TTI of multiple TTIs of a preset first scheduling window, or the second TTI is any TTI of multiple TTIs of a first scheduling window indicated by the scheduling indication;

determining that the scheduled node can transmit data in a second TTI according to the scheduling indication by using the preset spectrum resource comprises:

determining that a notification message sent by the scheduled node is received in any third TTI in a second scheduling window by using a designated spectrum resource, wherein the notification message indicates that the scheduled node can occupy the preset spectrum resource in the second TTI, the designated spectrum resource is a spectrum resource allocated to and used by a wireless communications system at which the scheduled node is located, third TTIs in the second scheduling window and second TTIs in the first scheduling window are in a one-to-one correspondence, and a time sequence of each third TTI is not after the time sequence of a second TTI corresponding to the third TTI; and determining that the data that is transmitted in the second TTI by using the preset spectrum resource is data sent by the scheduled node comprises:

determining that data that is transmitted in a second TTI by using the preset spectrum resource, wherein the second TTI corresponds to the third TTI in which the notification message is received and that is of the second TTIs of the first scheduling window is the data sent by the scheduled node.

6. A data transmission method, comprising:

receiving, in a first transmission time interval (TTI), a scheduling indication of transmitting data by using a preset spectrum resource, wherein the scheduling indication is sent by a scheduling node, wherein the preset spectrum resource has the following characteristics:

a use status of the preset spectrum resource needs to be sensed before the preset spectrum resource is occupied, and an occupation time for which the preset spectrum resource is occupied each time is limited; and when it is determined that data can be transmitted in the second TTI according to the scheduling indication by using the preset spectrum resource, transmitting data in the second TTI by using the preset spectrum resource, wherein the second TTI is a TTI used to send the data transmitted for the scheduling indication, and the second TTI is a TTI that is after the first TTI in a time sequence and that has a preset time sequence relationship with the first TTI.

7. The method according to claim 6, wherein:

the second TTI and the first TTI have a preset fixed time sequence relationship; and when it is determined that data can be transmitted in the second TTI according to the scheduling indication by using the preset spectrum resource, transmitting data in the second TTI by using the preset spectrum resource comprises:

when it is determined that the preset spectrum resource is available in the second TTI, sending a notification message in a third TTI by using a designated spectrum resource, and transmitting data in the second TTI by using the preset spectrum resource, wherein the notification message indicates that a scheduled node can occupy the preset spectrum resource in the second TTI, the designated spectrum resource is a spectrum resource allocated to and used by a wireless communications system at which the scheduling node is located, and the third TTI is a TTI that has a preset time sequence relationship with the second TTI.

8. The method according to claim 6, wherein:

the second TTI is any TTI of multiple TTIs of a preset first scheduling window, or the second TTI is any TTI of multiple TTIs of a first scheduling window indicated by the scheduling indication; and when it is determined that data can be transmitted in the second TTI according to the scheduling indication by using the preset spectrum resource, transmitting data in the second TTI by using the preset spectrum resource comprises:

when it is determined that the preset spectrum resource is available in any second TTI existing among multiple second TTIs of the first scheduling window, transmitting data in the second TTI of the available preset spectrum resource by using the preset spectrum resource.

9. The method according to claim 8, wherein when it is determined that data can be transmitted in the second TTI according to the scheduling indication by using the preset spectrum resource, the method further comprises:

sending a notification message in a third TTI by using a designated spectrum resource, wherein the third TTI corresponds to the second TTI of the available preset spectrum resource and that is of third TTIs of a second scheduling window, wherein the notification message indicates that a scheduled node can occupy the preset spectrum resource in the second TTI, the designated spectrum resource is a spectrum resource allocated to and used by a wireless communications system at which the scheduling node is located, third TTIs in the second scheduling window, and second TTIs in the first scheduling window are in a one-to-one correspondence and each third TTI, and a second TTI corresponding to the third TTI have a preset fixed time sequence relationship.

10. A data transmission device, comprising:
a transmitter, configured to send, in a first transmission time interval (TTI) to a scheduled node, a scheduling indication of transmitting data by using a preset spectrum resource, wherein the preset spectrum resource has the following characteristics:
   a use status of the preset spectrum resource needs to be sensed before the preset spectrum resource is occupied, and
   an occupation time for which the preset spectrum resource is occupied each time is limited;
a processor, configured to determine that the scheduled node can transmit data in a second TTI according to the scheduling indication by using the preset spectrum resource, wherein the scheduling indication is sent by the transmitter, wherein the second TTI is a III used to send the data that is transmitted by the scheduled node according to the scheduling indication, and the second TTI is a TTI that is after the first TTI in a time sequence and that has a preset time sequence relationship with the first TTI; and
wherein after the processor determines that the scheduled node can transmit data in the second TTI according to the scheduling indication by using the preset spectrum resource, wherein the scheduling indication is sent by the transmitter, the processor is configured to:
   determine that the data that is transmitted in the second TTI by using the preset spectrum resource is data sent by the scheduled node.

11. The device according to claim 10, wherein the processor is configured to determine that a notification message sent by the scheduled node is received in a third III by using a designated spectrum resource, wherein the notification message indicates that the scheduled node can occupy the preset spectrum resource in the second TTI, the designated spectrum resource is a spectrum resource allocated to and used by a wireless communications system at which the scheduled node is located, the third TTI is a TTI whose time sequence is not after the time sequence of the second TTI, and the second TTI and the first TTI have a preset fixed time sequence relationship.

12. The device according to claim 10, wherein the processor is further configured to:
before it is determined that the scheduled node can transmit data in a second TTI according to the scheduling indication by using the preset spectrum resource, receive and pre-process the data that is transmitted in the second TTI by using the preset spectrum resource;
determine that a notification message sent by the scheduled node is received in a third TTI by using a designated spectrum resource, wherein the notification message indicates that the scheduled node can occupy the preset spectrum resource in the second TTI, the designated spectrum resource is a spectrum resource allocated to and used by a wireless communications system at which the scheduled node is located, the third TTI is a TTI whose time sequence is after the time sequence of the second TTI, and the second TTI and the first TTI have a preset fixed time sequence relationship; and
receive, in the third TTI by using the designated spectrum resource, the notification message sent by the scheduled node.

13. The device according to claim 10, wherein the processor is configured to determine, according to information about a detected signal that is sent by the scheduled node in the second TTI by using the preset spectrum resource, that the scheduled node can transmit the data in the second TTI according to the scheduling indication by using the preset spectrum resource, wherein the second TTI and the first TTI have a preset fixed time sequence relationship.

14. The device according to claim 10, wherein the processor is configured to:
determine that a notification message sent by the scheduled node is received in any third TTI in a second scheduling window by using a designated spectrum resource, wherein the notification message indicates that the scheduled node can occupy the preset spectrum resource in the second TTI, the designated spectrum resource is a spectrum resource allocated to and used by a wireless communications system at which the scheduled node is located, third TTIs in the second scheduling window and second TTIs in the first scheduling window are in a one-to-one correspondence, and a time sequence of each third TTI is not after the time sequence of a second TTI corresponding to the third TTI, and wherein the second TTI is any TTI of multiple TTIs of a preset first scheduling window or the second TTI is any TTI of multiple TTIs of a first scheduling window indicated by the scheduling indication; and
determine that data that is transmitted in a second TTI by using the preset spectrum resource, wherein the second TTI corresponds to the third ITT in which the notification message is received and that is of the second TTIs of the first scheduling window is the data sent by the scheduled node.

15. A data transmission device, comprising:
a receiver, configured to receive, in a first transmission time interval (TTI), a scheduling indication of transmitting data by using a preset spectrum resource, wherein the scheduling indication is sent by a scheduling node, wherein the preset spectrum resource has the following characteristics:
   a use status of the preset spectrum resource needs to be sensed before the preset spectrum resource is occupied, and
   an occupation time for which the preset spectrum resource is occupied each time is limited; and
a transmitter, configured to:
   when it is determined that data can be transmitted in the second III according to the scheduling indication by using the preset spectrum resource, and the scheduling indication is received by the receiver, transmit data in the second TTI by using the preset spectrum resource, wherein the second TTI is a TTI used to send the data transmitted for the scheduling indication, and the second TTI is a TTI that is after the first TTI in a time sequence and that has a preset time sequence relationship with the first TTI.

16. The device according to claim 15, wherein the transmitter is configured to:
when it is determined that the preset spectrum resource is available in the second TTI, send a notification message in a third TTI by using a designated spectrum resource; and
transmit data in the second TTI by using the preset spectrum resource, wherein the notification message indicates that a scheduled node can occupy the preset spectrum resource in the second TTI, the designated spectrum resource is a spectrum resource allocated to and used by a wireless communications system at which the scheduling node is located, the third TTI is a TTI that has a preset time sequence relationship with the second TTI, and the second TTI and the first TTI have a preset fixed time sequence relationship.

17. The device according to claim 15, wherein the transmitter is configured to:

when it is determined that the preset spectrum resource is available in any second TTI existing among multiple second TTIs of the first scheduling window, transmit data in the second TTI of the available preset spectrum resource by using the preset spectrum resource, wherein the second TTI is any TTI of multiple TTIs of a preset first scheduling window; or the second TTI is any TTI of multiple TTIs of a first scheduling window indicated by the scheduling indication.

18. The device according to claim 17, wherein the transmitter is further configured to:

when it is determined that data can be transmitted in the second TTI according to the scheduling indication by using the preset spectrum resource, send a notification message in a third TTI by using a designated spectrum resource, wherein the third TTI corresponds to the second TTI of the available preset spectrum resource and that is of third TTIs of a second scheduling window, wherein the notification message indicates that a scheduled node can occupy the preset spectrum resource in the second TTI, the designated spectrum resource is a spectrum resource allocated to and used by a wireless communications system at which the scheduling node is located, third TTIs in the second scheduling window, and second TTIs in the first scheduling window are in a one-to-one correspondence and each third TTI and a second TTI corresponding to the third TTI have a preset fixed time sequence relationship.

* * * * *